(12) United States Patent
Boesen

(10) Patent No.: US 9,967,671 B2
(45) Date of Patent: May 8, 2018

(54) COMMUNICATION DEVICE

(71) Applicant: Peter Vincent Boesen, München (DE)

(72) Inventor: Peter Vincent Boesen, München (DE)

( * ) Notice: Subject to any disclaimer, the term of this patent is extended or adjusted under 35 U.S.C. 154(b) by 123 days.

(21) Appl. No.: 14/883,601

(22) Filed: Oct. 14, 2015

(65) Prior Publication Data

US 2016/0035218 A1    Feb. 4, 2016

Related U.S. Application Data

(63) Continuation of application No. 13/967,415, filed on Aug. 15, 2013, which is a continuation of application
(Continued)

(51) Int. Cl.
| | | |
|---|---|---|
| *H04R 5/033* | (2006.01) | |
| *H04M 1/05* | (2006.01) | |
| *H04M 1/60* | (2006.01) | |
| *H04R 1/10* | (2006.01) | |
| *H04N 5/44* | (2011.01) | |

(Continued)

(52) U.S. Cl.
CPC .......... *H04R 5/033* (2013.01); *G06Q 20/325* (2013.01); *G06Q 30/0633* (2013.01); *G08C 17/02* (2013.01); *H04B 1/385* (2013.01); *H04M 1/05* (2013.01); *H04M 1/6066* (2013.01); *H04M 1/7253* (2013.01); *H04N 5/4403* (2013.01); *H04R 1/1016* (2013.01); *H04R 1/1041* (2013.01); *H04R 1/1091* (2013.01); *H04R 5/04* (2013.01); *H04S 7/308* (2013.01); *H04W 4/008* (2013.01); *G08C 2201/31* (2013.01); *G08C 2201/92* (2013.01); *H04B 2001/3866* (2013.01); *H04M 1/72558* (2013.01); *H04M 2250/12* (2013.01); *H04R 2420/07* (2013.01); *H04R 2460/13* (2013.01)

(58) Field of Classification Search
CPC combination set(s) only.
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| (Continued) | | |

FOREIGN PATENT DOCUMENTS

| | | |
|---|---|---|
| GB | 2074817 | 4/1981 |
| JP | 06292195 | 10/1998 |

OTHER PUBLICATIONS

Staab, Wayne J., et al., "A One-Size Disposable Hearing Aid is Introduced", The Hearing Journal 53(4):36-41) Apr. 2000.

*Primary Examiner* — Amir Etesam
(74) *Attorney, Agent, or Firm* — Goodhue, Coleman & Owens, P.C.

(57) ABSTRACT

An apparatus may include an ear piece housing, an intelligent control disposed within the ear piece housing, and a transceiver disposed within the ear piece housing and operatively connected to the intelligent control. An apparatus may further include a microphone operatively connected to the intelligent control, a speaker operatively connected to the intelligent control, and a sensor operatively connected to the intelligent control. An apparatus is adapted to receive input from the microphone and/or the sensor and communicate the input through the transceiver to an electronic device in operative communication with the transceiver.

14 Claims, 24 Drawing Sheets

Related U.S. Application Data

No. 11/761,850, filed on Jun. 12, 2007, now Pat. No. 8,526,646, which is a continuation-in-part of application No. 11/251,279, filed on Oct. 14, 2005, now Pat. No. 7,899,194, and a continuation-in-part of application No. 11/222,014, filed on Sep. 8, 2005, which is a continuation-in-part of application No. 10/842,207, filed on May 10, 2004.

(51) Int. Cl.

| | |
|---|---|
| *H04B 1/3827* | (2015.01) |
| *H04W 4/00* | (2018.01) |
| *H04R 5/04* | (2006.01) |
| *H04S 7/00* | (2006.01) |
| *G06Q 20/32* | (2012.01) |
| *G06Q 30/06* | (2012.01) |
| *G08C 17/02* | (2006.01) |
| *H04M 1/725* | (2006.01) |

(56) References Cited

U.S. PATENT DOCUMENTS

| | | |
|---|---|---|
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,771,438 A | 6/1998 | Palermo et al. |
| 5,802,167 A | 9/1998 | Hong |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,094,492 A | 7/2000 | Boesen |
| 6,111,569 A | 8/2000 | Brusky et al. |
| 6,112,103 A | 8/2000 | Puthuff |
| 6,181,801 B1 | 1/2001 | Puthuff et al. |
| 6,208,372 B1 | 3/2001 | Barraclough |
| 6,339,706 B1 * | 1/2002 | Tillgren ............... G08C 17/02 455/419 |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 7,136,282 B1 | 11/2006 | Rebeske |
| 2001/0005197 A1 | 6/2001 | Mishra et al. |
| 2001/0056350 A1 | 12/2001 | Calderone et al. |
| 2002/0002413 A1 | 1/2002 | Tokue |
| 2002/0007510 A1 | 1/2002 | Mann |
| 2002/0030637 A1 | 3/2002 | Mann |
| 2002/0057810 A1 | 5/2002 | Boesen |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0218064 A1 | 11/2003 | Conner et al. |
| 2004/0042629 A1 * | 3/2004 | Mellone ............... H04R 1/1058 381/310 |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2006/0074671 A1 | 4/2006 | Farmaner et al. |
| 2008/0189110 A1 * | 8/2008 | Freeman ............ G06Q 30/0241 704/251 |
| 2008/0254780 A1 | 10/2008 | Kuhl et al. |
| 2009/0177097 A1 * | 7/2009 | Ma ..................... A63B 71/0686 600/500 |

* cited by examiner

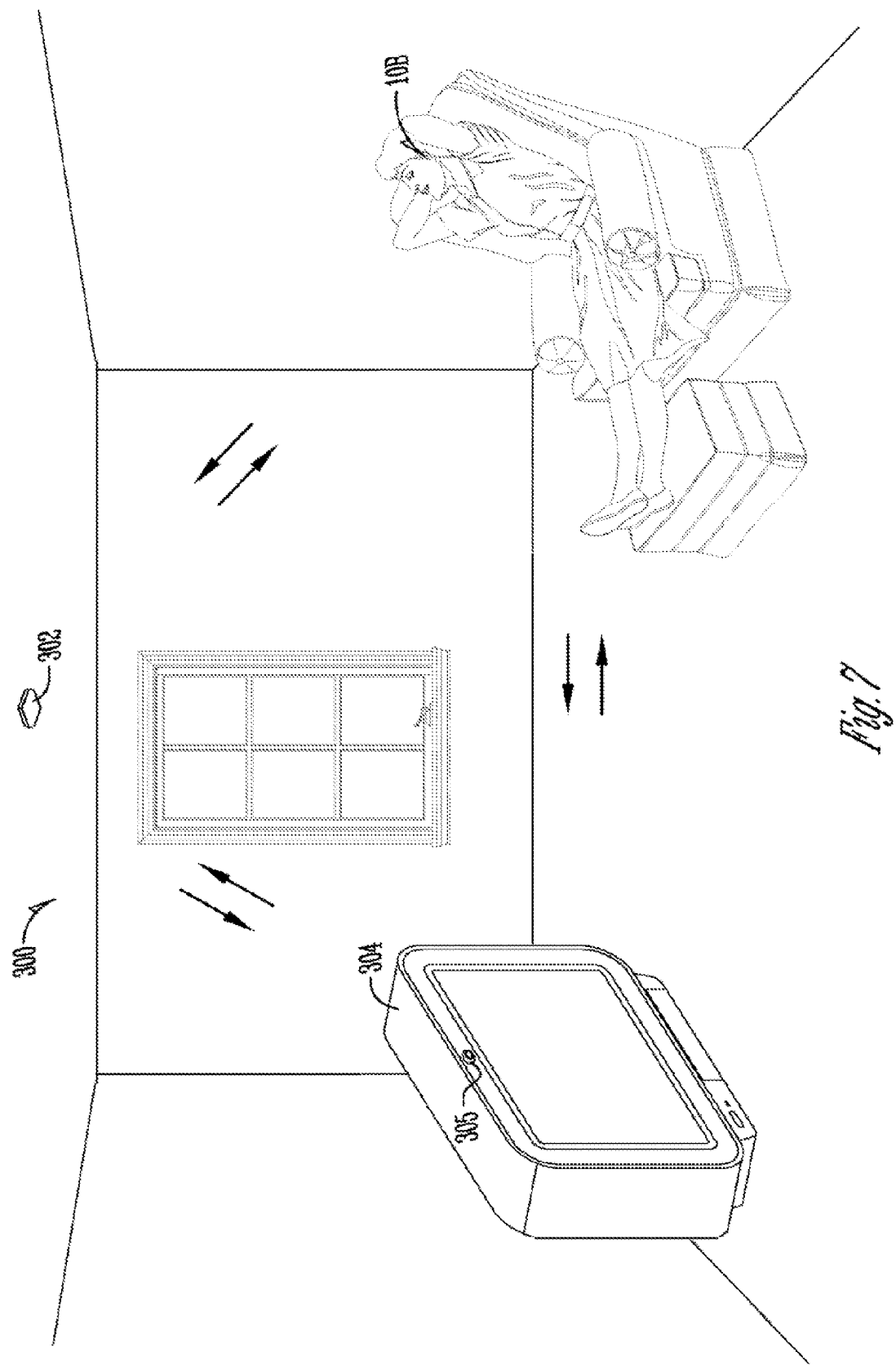

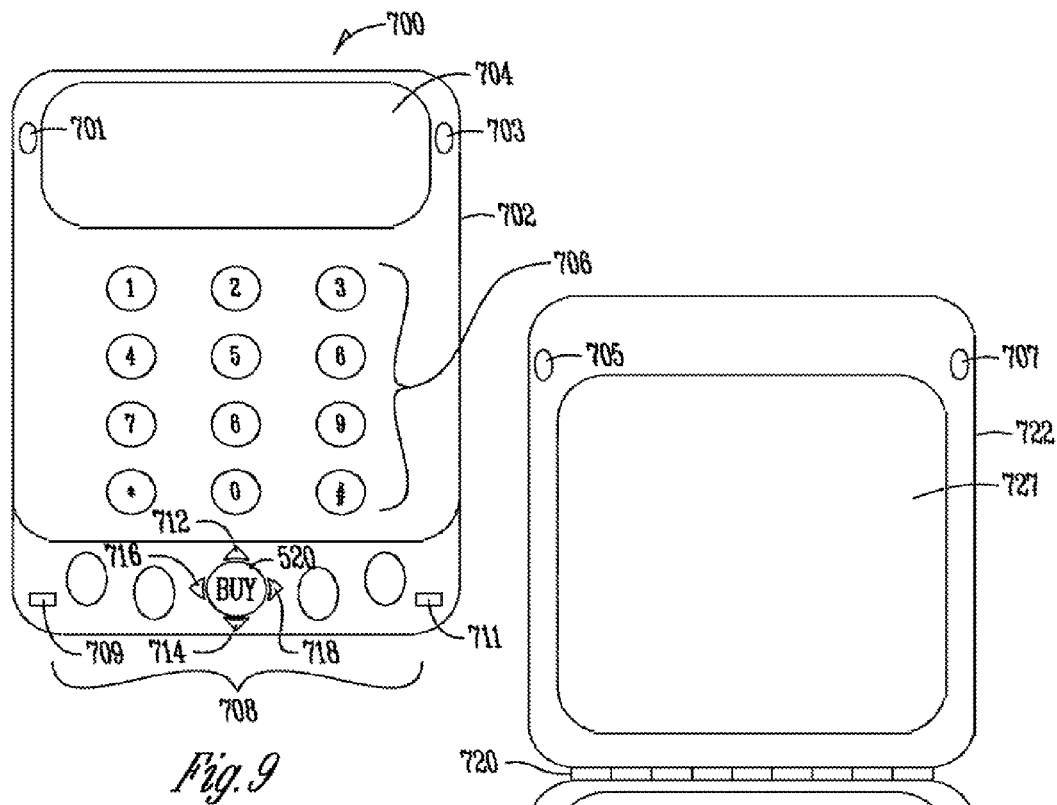
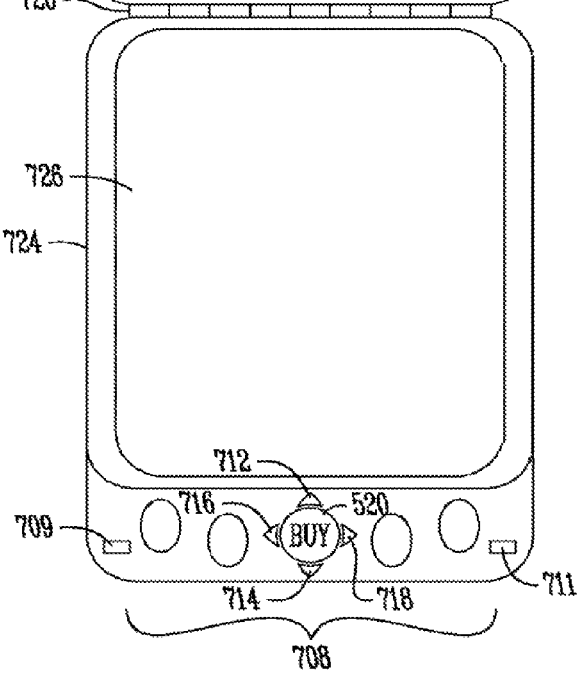

SELECTION OPTIONS

650

CREDIT CARD OR ACCOUNT NO. [____] —652

LIST OF RECENT AUDIO EVENTS

| CATEGORY | NAME | ARTIST | CHANNEL | TIME | PRICE |
|---|---|---|---|---|---|
| --- | --- | --- | --- | --- | --- |
|  |  |  |  |  |  |
|  |  |  |  |  |  |
|  |  |  |  |  |  |
|  |  |  |  |  |  |

654  656  658  660  662  664

666 —○ GROUP ALL SELECTIONS ON CD
      (PLUS FEE OF $X)
668 —○ SEND SELECTIONS AS MP3's
669 —○ SEND AS DOWNLOAD
      TO HARD DRIVE                [ ORDER ]—670

*Fig. 19*

COMMUNICATION DEVICE

CROSS-REFERENCE TO RELATED APPLICATIONS

This application is a continuation of application Ser. No. 13/967,415 filed on Aug. 15, 2013 which is a Continuation of application Ser. No. 11/761,850 filed Jun. 12, 2007, which is a Continuation-in-Part of application Ser. No. 11/251,279 filed Oct. 14, 2005 now U.S. Pat. No. 7,899,194 issued Mar. 1, 2011 and a Continuation-in-Part of application Ser. No. 11/222,014 filed Sep. 8, 2005 which is a Continuation-in-Part of application Ser. No. 10/842,207 filed May 10, 2004, which applications are hereby incorporated by reference in their entirety.

BACKGROUND OF THE INVENTION

The present invention relates to communications, including voice communications, and other audio communications, such as those associated with phones, or entertainment devices, or other types of personal electronic devices. Additional background in formation is present in the following patents, all of which are hereby incorporated by reference in their entirety: U.S. Pat. No. 7,215,790 to Boesen et al., entitled Voice transmission apparatus with UWB; U.S. Pat. No. 7,209,569 to Boesen, entitled Earpiece with an inertial sensor; U.S. Pat. No. 7,203,331 to Boesen, entitled Voice communication device; U.S. Pat. No. 6,987,986 to Boesen, entitled Cellular telephone, personal digital assistant with dual lines for simultaneous use; U.S. Pat. No. 6,892,082 to Boesen, entitled Cellular telephone and personal digital assistant, U.S. Pat. No. 6,879,698 to Boesen, entitled Cellular telephone, personal digital assistant with voice communication unit; U.S. Pat. No. 6,852,084, entitled Wireless physiological pressure sensor and transmitter with capability of short range radio frequency transmissions; U.S. Pat. No. 6,823,195 to Boesen, entitled Ultra short range communication with sensing device and method; U.S. Pat. No. 6,738,485 to Boesen, entitled Apparatus, method and system for ultra short range communication; and U.S. Pat. No. 6,694,180 to Boesen, entitled Wireless biopotential sensing device and method with capability of short-range radio frequency transmission and reception; U.S. Published Application No. 2003/0115068 to Boesen, entitled Voice communication device with foreign language translation; U.S. Published Application No. 2004/0160511 to Boesen, entitled Personal communications device.

One problem relates to the quality of audio available to a user. Numerous attempts have been made to provide high quality of audio to users, whether in the context of music and videos for entertainment, or in the context of audio communications.

A seemingly unrelated problem exists with respect to handsfree devices. Numerous advantages are associated with handsfree devices which make them desirable in various situations, including when they are used in combination with cell phones. In addition, the use of handsfree devices can promote privacy, to some extent. Despite these well-recognized advantages and benefits of handsfree devices, problems remain. Due to the discomfort of handsfree devices, and the need to hear environmental devices, handsfree devices to date have focused on reproducing sound in only one ear.

Another problem relates to the control of multiple voice-controlled or audio-linked devices. Although audio linkage or voice-control is growing in popularity, problems remain both in terms of the quality of audio provided. With more prevalence in voice communication devices there may also be problems in directing voice or audio communications to a specific device.

Therefore, it is a primary object, feature, or advantage of the present invention to improve upon the state of the art.

It is a further object, feature, or advantage of the present invention to provide a voice communication system that provides for transducing and playing multi-channel audio using an earpiece.

Another object, feature, or advantage of the present invention is to provide one or more earpieces capable of short range wireless communications such as Bluetooth or UWB which may be used in providing stereophonic audio.

It is a still further object, feature, or advantage of the present invention to provide a voice communication system that provides for binaural transducing and playing of audio Yet a further object, feature, or advantage of the present invention to provide a voice communication system that provides for stereophonic transducing and playing of audio.

Another object, feature, or advantage of the present invention is to provide a voice transduction device using UWB/Bluetooth or other short range wireless technologies to communicate with a computer or other device.

Yet another object, feature, or advantage of the present invention is to provide for voice communication suitable for voice-to-text applications.

It is a further object feature, or advantage of the present invention is to provide for binaural, or stereophonic listening without the nuisance of head phones or any linking material spanning the head from the right earpiece to the left earpiece.

Yet another object, feature, or advantage is to provide for binaural or stereophonic listening with a handsfree device.

A further object, feature, or advantage of the present invention is to provide for transducing, processing of, and playback of voice sound information.

A still further object, feature, or advantage of the present invention is to use a phone to control one or more earpieces.

A still further object, feature, or advantage of the present invention is to take into account head size of a user.

Another object, feature, or advantage of the present invention is to allow for multiple output transducers in an earpiece.

Another object, feature, or advantage of the present invention is to provide for tracking of a user's head movement.

Yet another object, feature, or advantage of the present invention is to interpret head movement or head orientation of a user.

A further object, feature, or advantage of the present invention is to communicate information such as head movement or head orientation from an earpiece or headset to another device.

A still further object, feature, or advantage of the present invention is to communicate an alert such as may be associated with head movement indicative of a user falling sleep to another device such as a computer or radio.

Yet another object, feature, or advantage of the present invention is to use the speaker of an electronic device such as a cell phone in combination with one or more earpieces.

A further object, feature, or advantage of the present invention is to allow audiometrics of an incoming signal to be modified according to a user's specific audiometric demands.

A still further object, feature, or advantage of the present invention is to communicate whether a signal is coming from a right earpiece or a left earpiece.

It is a further object, feature, or advantage of the present invention to provide a method, apparatus, and system for purchasing an audio or video recording of an audio or video event that is convenient to listeners.

A still further object, feature, or advantage of the present invention is to provide a method, apparatus, and system for purchasing an audio or video recording of an audio or video event that encourages sales of the recording, and therefore discourages unauthorized copying.

Another object, feature, or advantage of the present invention is to provide a method, apparatus, and system for purchasing an audio or video recording of an event that allows a listener to purchase the recording of the event during, or shortly after the event associated with the audio or video.

Yet another object, feature, or advantage of the present invention to provide a method, apparatus, and system for purchasing recording of an event that does not significantly distract the driver of a motor vehicle.

It is a further object, feature, or advantage of the present invention to provide a method, apparatus, and system for purchasing an audio or video recording of an event that provides for delivery of the recording to the user.

A still further object, feature, or advantage of the present invention to provide a method, apparatus, and system for purchasing an audio or video recording that does not require the listener to take notice of the name of the artist or name of the song.

Another object, feature, or advantage of the present invention to provide a method, apparatus, and system for purchasing an audio recording that quantifies the relationship between an audio event and sales of audio recordings of the audio event.

Yet another object, feature, or advantage of the present invention is to provide a earpiece having one or more inertial sensors for sensing position and/or movement.

A further object, feature, or advantage of the present invention is to provide an earpiece adapted to interpret position or movement information.

A still further object, feature, or advantage of the present invention is to provide an earpiece adapted to communicate position or movement information or interpretation of such information over a communications link.

One or more of these and/or other objects, features, and advantages of the present invention will become apparent from the specification and claims that follow. These objects, features, or advantages of the present invention do not limit the invention as the present invention can provide other features and advantages in different embodiments and different contexts.

BRIEF SUMMARY OF THE INVENTION

According to one aspect of the present invention a system is provided. The system may include a personal electronic device having a housing and an ultra-wide band transceiver disposed within the housing. The system may also include a stereophonic system for sending audio information to a right ear and a left ear of a user, the stereophonic system having one or more additional ultra-wideband transceivers. The ultra-wideband transceiver of the personal electronic device and the additional linked ultra-wideband transceiver of the stereophonic system are adapted for providing audio communications therebetween.

According to another aspect of the invention, a system may be provided. The system may include a plurality of personal electronic devices, each including a housing and an ultra-wide band transceiver disposed within the housing. The earpiece includes an earpiece housing, at least one input sensor, a speaker, one or more additional ultra-wide band transceivers disposed within the earpiece housing, and a switch for switching between the plurality of personal electronic devices. The switch may be implemented in software or hardware.

According to another aspect of the present invention, a system includes an earpiece having a microphone, a speaker, and a first short range transceiver. The system also includes a plurality of electronic devices, each of the plurality of electronic devices having a second short range transceiver in communication with the first short range transceiver. The earpiece is adapted for context driven selection between and communication with each of the plurality of electronic devices.

According to yet another aspect of the present invention, a cellular phone includes a phone housing, a cellular voice transceiver disposed within the phone housing, and at least one bone conduction sensor operatively connected to the voice transceiver.

BRIEF DESCRIPTION OF THE DRAWINGS

FIG. 7 is a pictorial representation of another embodiment of the invention.

FIGS. 9-10 provide a pictorial representation of one embodiment of a phone according to the present invention FIG. 11 provides a pictorial representation of the phone of FIGS. 9-10 with a user interface that allows the source of audio or video and delivery preferences to be selected.

FIG. 19 is graphical representation of one embodiment of selection options according to one embodiment of the present invention.

DETAILED DESCRIPTION OF THE PREFERRED EMBODIMENTS

The present invention will be described as it applies to its preferred embodiments. It is not intended that the present invention be limited to the described embodiments. It is intended that the invention cover all modifications and alternatives which may be included within the spirit and scope of the invention. According to one aspect, the present invention provides for binaural and/or stereophonic sensing and reproduction of sound by sensing sounds within the external auditory canal of a user and/or reproducing sounds, such as, but not limited to, stereophonic sounds within both external auditory canals of a user.

A general description of the present invention as well as a preferred embodiment has been set forth above. Those skilled in the art will recognize and will be able to practice additional variations and the methods and devices described which fall within the teachings of this invention. Accordingly, all such modifications and additions are deemed to be within the scope of the invention which is to be limited only by the claims appended hereto.

According to one aspect, the present invention includes a method and system for purchasing recordings of audio or video events. The present invention is described in terms of the preferred embodiments that follow.

According to another aspect, the present invention provides for a phone being used to collect identifying information about an audio or video event and to initiate a purchase of an audio or video recording of the audio or video event. The present invention contemplates that the collection of information and initiation of a purchase can be performed in any number of ways.

Figure 1:
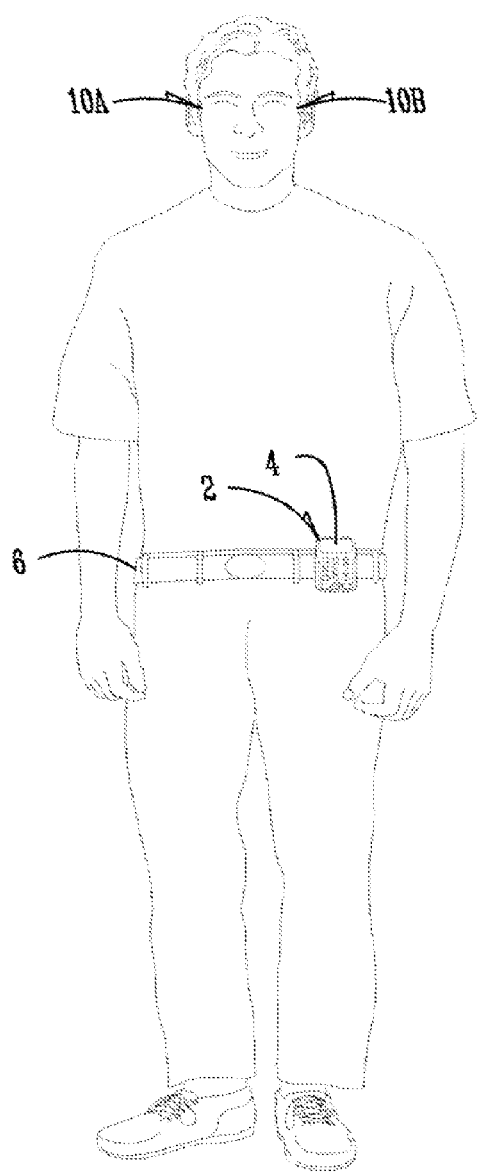
FIG. 1 is a diagram of a personal electronic device worn by a person according to the present invention.

FIG. 1 shows a personal electronic device 2 associated with a person. The personal electronic device may be a phone, an entertainment device, or other type of personal electronic device or computer. The device as shown has a display 4. The device may be worn on a belt 6 as shown or may be placed in a pocket or may be carried by the person. The personal electronic device 2 is in operative communication with earpiece 10A and/or earpiece 10B. As will be explained in further detail, this configuration provides for the ability to collect and reproduce stereophonic sound.

Figure 2:
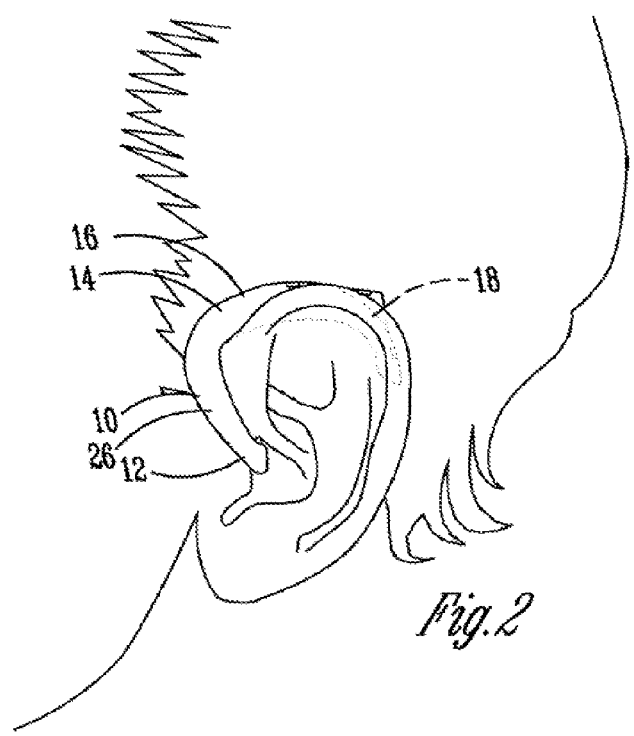
FIG. 2 is a representation of the earpiece of one embodiment of the present invention fitted on the ear.

FIG. 2 shows a pictorial representation of one embodiment of one earpiece 10 as worn in a person's ear. The earpiece has an external ear canal portion 12 which is fitted within the ear. The earpiece 10 has an ear attachment portion 14 fitted around the ear. The earpiece 141 in its preferred form houses a processor 16 and a transceiver 18. The earpiece 10 also houses at least one sensor such as an air conduction sensor or a bone conduction sensor and a speaker. The earpiece 10 corresponds to one of earpiece 10A and earpiece 10B shown in FIG. 1.

Figure 3:
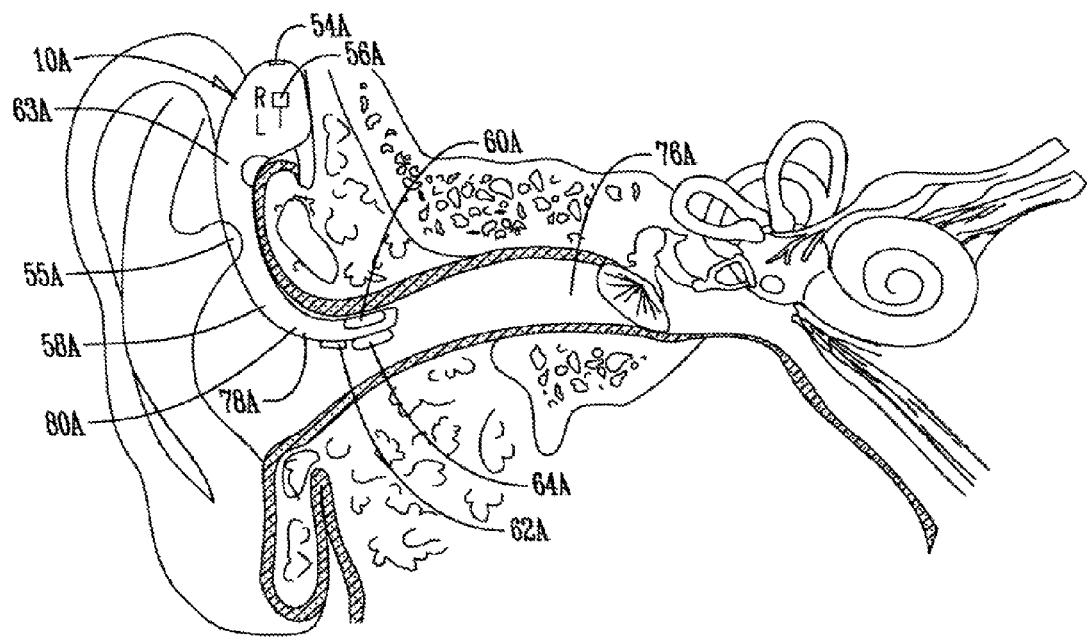
FIG. 3 is a diagram of one embodiment of an earpiece of the present invention fitted within a right ear of a user.

FIG. 3 discloses an example of the earpiece 10A of the present invention having a housing 80A. The earpiece 10A is designed to be worn at the ear. As shown in FIG. 3, an external canal portion 58A of the earpiece 10A is positioned in the external auditory canal 76A of the user. The external auditory canal portion of the earpiece preferentially includes a bone conduction sensor 60A and an air conduction sensor 62A located on a resilient member 78A. An internal antenna 54A is also shown. A speaker 64A is also shown which is also preferably positioned within the external auditor canal 76A of the user. Note that the earpiece 10A of the preferred embodiment does not occlude or block the external auditory canal 76A of the user. This feature increases the comfort of the user so that the user can wear the earpiece for an extended period of time. Also, this feature is important in that it allows the user to also hear environmental sounds. These features are particularly important as the user will be wearing two earpieces to provide for binaural or stereophonic communications. The earpiece may be programmed to compensate for auditory deficits of the user providing amplification, gain or compression as necessary to fit the specific audiometric requirements of the user. In addition, the earpiece may be programmed to accommodate preferences of the user that are not based on the auditory deficits of the user. There is a manual input such as a switch 56A shown that can be used to set the earpiece as a right ear or a left ear. Instead of a hardware setting, the setting can be a software setting or switch.

There may also be a switch 55A accessible to a user of the earpiece. The switch 55A where present, need not be in the location shown, what is shown is merely one possible location. The switch may be used to switch between devices. For example, where the earpiece 10A includes a short range transceiver such as a UWB transceiver, the earpiece 10A may be used with multiple devices. Thus, for example the earpiece 10A may be used to link with a phone, an entertainment device such as a music player, a video player, a television, a radio, a computer, a printer, a camera, or other type of device. The switch 55A may be used to cycle between different available audio sources. In addition, where the earpiece 10A includes one or more input sensors such as the bone conduction sensor 60A or air conduction sensor 62A, the earpiece may receive voice commands for switching between different audio communications links. The audio communication links may be one-way communications link or two-way communications links where one or more input sensors are available in the earpiece 10A. The present invention contemplates that other switches could be used for additional functions. In addition, the earpiece may include one or more sensors such as inertial sensor 63A which may be used to determine head orientation and/or track head movement. The tracking of head orientation or head movement may be used to provide additional contextual information. For example, where multiple audio/video sources are present, the user may press a switch 55A to cycle between the different available sources. The sources may be presented in the order that increases the likelihood that the user will find the desired source in the least amount of time. In making such a determination, one variable that can be taken into account is the head orientation or recent head movement. Sources associated with head orientation or head movement may be presented first in the cycle. In addition, the order that the sources are presented may also take into account the most recent sources of interest to the user or other patterns of usage of the user.

Figure 4:
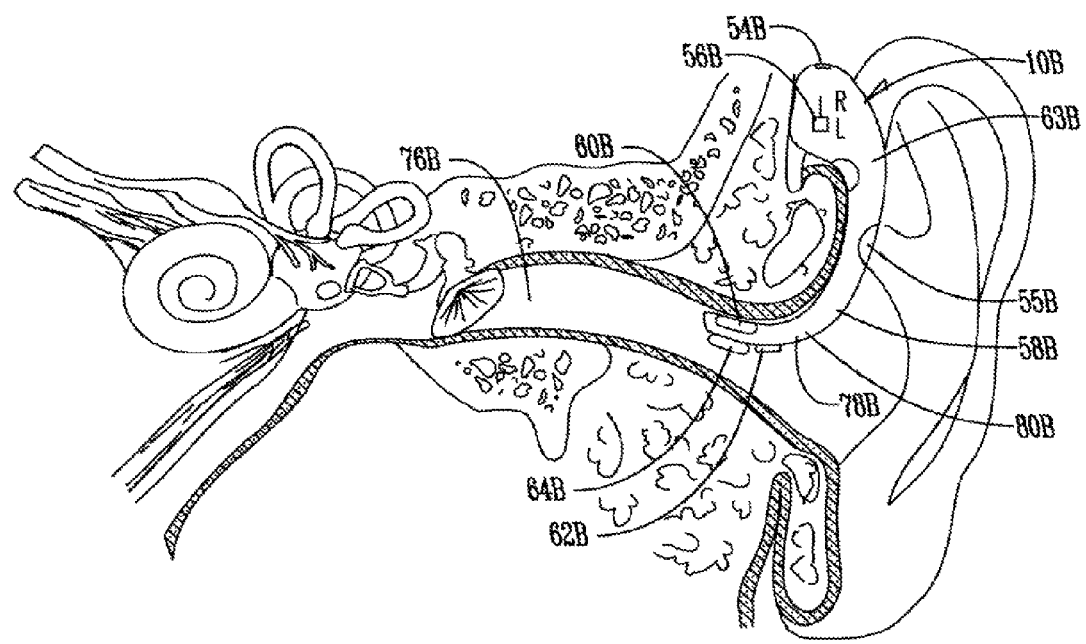
FIG. 4 is a diagram of one embodiment of an earpiece of the present invention fitted within a left ear of a user.

FIG. 4 discloses an example of an earpiece which is substantially identical to earpiece 10A of FIG. 3 but is placed in the opposite ear of the same user. FIG. 4 discloses an example of the earpiece 10B of the present invention having a housing 80B. The earpiece 10B is designed to be worn at the ear. As shown in FIG. 4, an external canal portion 58B of the earpiece 10B is positioned in the external auditory canal 76B of the user. The external auditory canal portion of the earpiece includes a bone conduction sensor 60B and an air conduction sensor 62B located on a resilient member 78B. An internal antenna 54B is also shown. A speaker 64B is also shown which is also preferably positioned within the external auditory canal 76B of the user. In addition, the earpiece may be programmed to accommodate preferences of the user that are not based on the auditory deficits of the user. There is a manual input such as a switch 56B shown that can be used to set the earpiece as a right ear or a left ear. Instead of a hardware setting, the setting can be a software setting or switch. The present invention contemplates that other switches could be used for additional functions. In addition, the earpiece may include one or more sensors such as inertial sensor 63B which is may be used to determine head orientation and/or track head movement. Other microphones placed in various positions on the body maybe also be able to accept external speech input for translation through the short rang linkage system or through the device 10B itself. Additional information regarding foreign language translation is presented in U.S. Patent Application 2003/0115068, herein incorporated by reference in its entirety.

There may also be a switch 55B accessible to a user of the earpiece. The switch 55B where present, need not be in the location shown, what is shown is merely one possible location. The switch may be used to switch between devices. For example, where the earpiece 10B includes a short range transceiver such as a UWB transceiver, the earpiece 10B may be used with multiple devices. Thus, for example the earpiece 10B may be used to link with a phone, an entertainment device such as a music player, a video player, a television, a radio, a computer, a printer, a camera, a GPS unit, a network appliance, or other type of device. The switch 55B may be used to cycle between different available audio sources. In addition, where the earpiece 10B includes one or more input sensors such as the bone conduction sensor 60B or air conduction sensor 62B, the earpiece may receive voice commands for switching between different audio communications links. The audio communication links may be one-way communications link or two-way communications links where one or more input sensors are available in the earpiece 10B.

Where both earpieces 10A and 10 are used together, they may form a stereophonic system. Where two earpieces are used together, only one of the two earpieces need have a switch 55A, 55B, where used to change between audio sources or channels or links. Instead of having a hardware switch, a software switch may also be used where one or more of the earpieces, or a headset have an input sensor and a processor and can process voice sound communications to determine voice commands.

Figure 5:
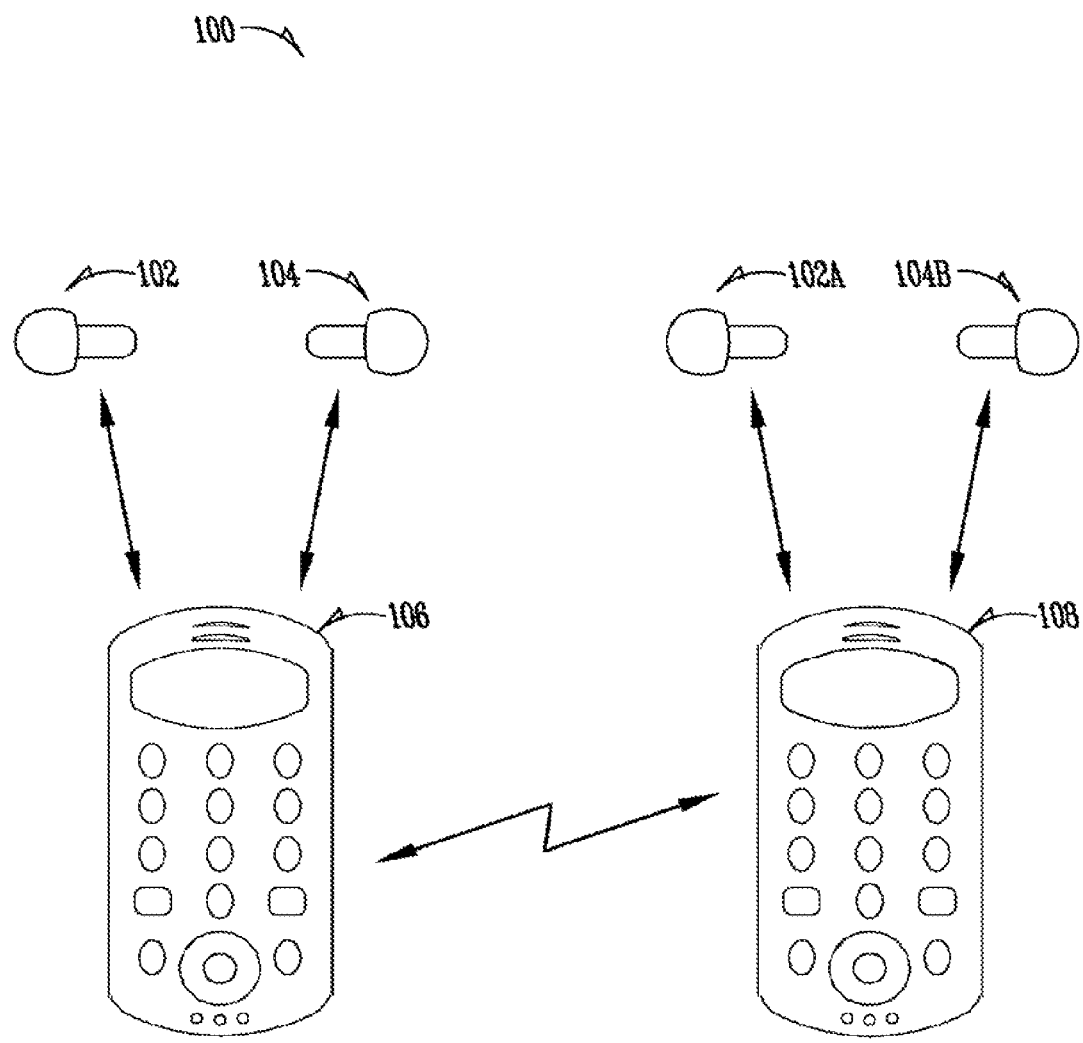
FIG. 5 is a pictorial representation of one embodiment of the present invention.

FIG. 5 discloses an example of one methodology of the present invention. In the system 100 shown in FIG. 5, there is a first earpiece 102 and a second earpiece 104, both earpieces associated with a first user. The earpieces shown are of a completely-in-canal (CIC), although the present invention can be used with behind-the-ear (BTE) or other types of earpieces. Preferably, the earpieces collect sound at or near the external auditory canal of the user and also reproduce sound at or near the external auditory canal of the user. The earpieces 102, 104 are in operative communication with a personal electronic device such as a phone 106. Each of the earpieces 102, 104 communicates one or more channels of audio information to the phone 106 and the phone 106 is adapted to communicate at least one channel of audio information to each earpiece. Thus, when used together, the earpieces 102, 104 provide for collecting stereophonic sound and reproducing stereophonic sound. It should also be appreciated that where stereophonic sound is not needed, only one of the earpieces may be used. Unless programmed specifically to do so, 102 and 104 will not communicate with phone 108, so that each set of earpieces only communicates with one phone at a time.

Each of the earpieces 102, 104 is preferably associated with a particular ear of the user. The present invention contemplates that this association can be made in a number of different ways. For example, each eat-piece 102, 104 can communicate an identifier to state that it is the left earpiece or a right earpiece as a part of a communications protocol. Alternatively, each earpiece will only receive signals associated with its particular identity. The setting for each earpiece can be accomplished manually (such as a small switch located anywhere on the housing) and/or through programming of the processor within each earpiece. In addition, each earpiece may function alone in a monotonic mode. Such functionality may be useful where one earpiece loses battery power. When each earpiece 102, 104 is associated with a particular ear of a user, then processing can also be performed on incoming audio signals to process the incoming audio signal according to the auditory capabilities of a particular user such as may be associated with a hearing aid or according to their auditory preferences. It should also be understood that because the earpiece 102, 104 is a communications device, different types of processing can be performed based on the source of the audio. For example, music received at the earpiece 102, 104 may be processed differently than a telephone call. Or a telephone call from one source may be processed differently than a telephone call from another source.

Because stereophonic sound is easily collected and reproduced at each earpiece, the present invention provides for communicating that stereophonic sound between users. For example, as shown in FIG. 5, stereophonic information can be communicated from phone 106 to a second phone 108 associated with a different user. This stereophonic information can then be transmitted to a second set of earpieces 102A, 104B, to provide stereo sound for the second user.

Figure 6:
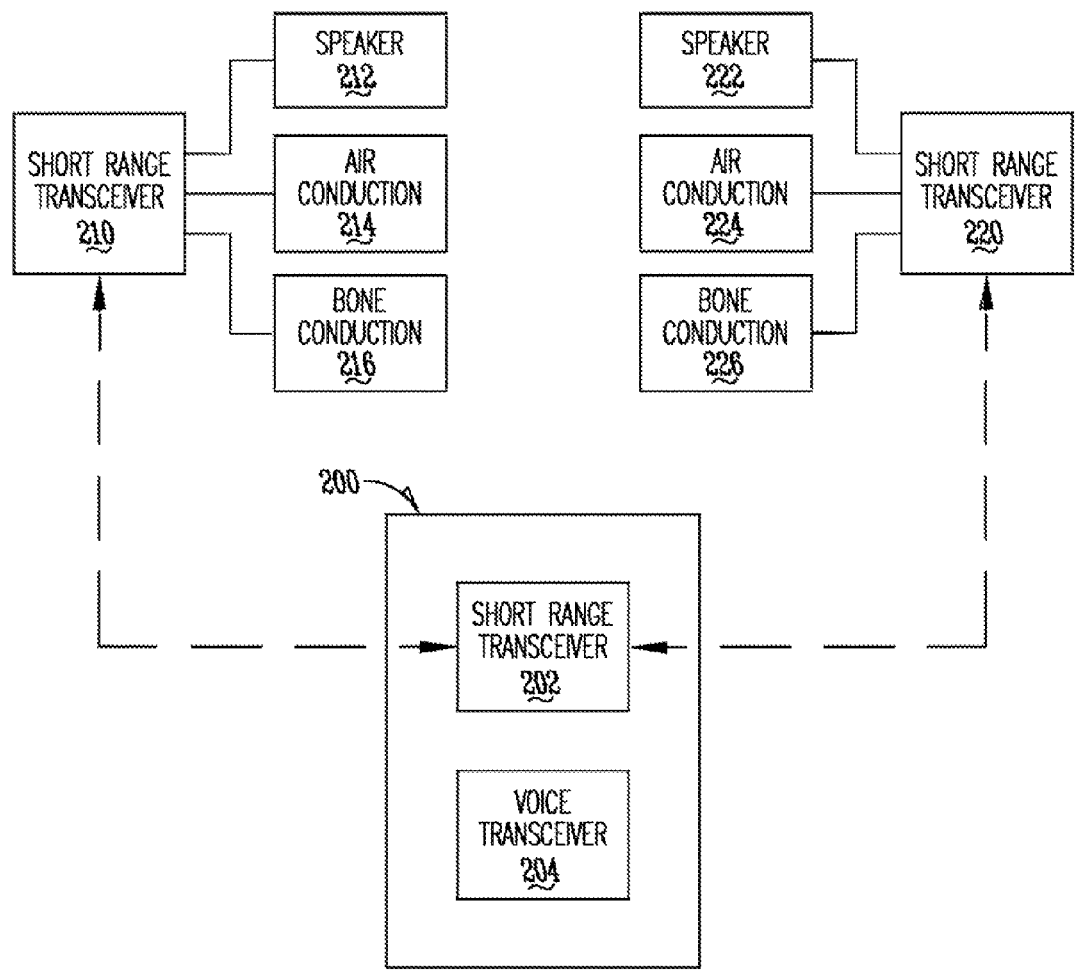
FIG. 6 is a block diagram of another embodiment of the present invention.

It should be understood that although FIG. 5 and FIG. 6 show a preferred embodiment where input sensors and a speaker are positioned directly within the external auditory canal of a user, this is not required. Instead the input sensors and speaker can be placed at or near the external auditory canal or proximate the external auditory canal. There is, however, some advantage in placement within the external auditory canal in that such placement allows for a closer approximation of binaural audio where audio is sensed and played back within the external auditory canal.

FIG. 6 is a block diagram showing another embodiment of the present invention. In FIG. 6, a personal electronic device 200 is shown. The personal electronic device 200 may be a personal communication device, such as a phone, a personal entertainment device, or other type of personal electronic device or computer or other electronic device. The personal electronic device has a short range transceiver 202 and an audio source 204. The audio source 204 may be provided by a voice transceiver for cellular communications, audio received from a stereo transmission associated with radio or television, or from audio created based on stored information. The short range transceiver 202 may be a BLUETOOTH, ultra-wideband (UWB), Wi-Fi or other type of short range transceiver.

The short range transceiver 202 of the personal electronic device 200 is in operative communication with short range transceiver 210 associated with a first earpiece and also associated with a speaker 212, an air conduction sensor 214, and an optional bone conduction sensor 216. The short range transceiver 202 of the personal electronic device 200 is also, preferably in operative communication with a second short range transceiver 220 associated with a second earpiece and also associated with a speaker 222, air conduction sensor 224, and an optional bone conduction sensor 226. Each earpiece can adjust the incoming signal to fit or adapt to the audiometric needs of the user. This can include auditory deficits of the user such as the type of processing typically performed by various hearing aids. This can also include preferences which can be set by the source or type of audio (such as but limited to music, audio accompanying video, audio associated with a phone call, audio associated with a phone call with a particular person, or other type of audio).

FIG. 7 illustrates another use of the present invention. As shown in FIG. 7 an environment 300 such as in a home is shown. The home includes a network with network nodes such as 302. A user is shown enjoying themselves as they rest on a recliner and wear an earpiece 10B while watching television 304. Note there is an image sensor 305 such as a video camera built-into or otherwise associated with the television 304. Video imager acquired by the image sensor 305 may be used for video conferencing purposes, or may be processed for other purposes, such as, but not limited to, determining location of the user. The earpiece 10A and/or 10B provides audio sounds to the user. The present invention provides for audio from or associated with the television 304 to be communicated through the network and be transmitted from the network node 302 to the earpiece 10A and/or 10B. Thus the user can control the incoming sounds received at the earpiece to both, or alternatively, one ear. Multiple persons in the same room can be watching the same television, but each have their earpiece set to different volumes or have additional audio processing performed by their respective earpiece or earpieces to meet their own audiometric needs. Although in the embodiment shown, audio associated with the television is communicated through the network node 302, audio could also be communicated directly from the television with 304 with a short range transceiver. Other audio such as, but not limited to phone calls, can be transferred directly to earpiece 10A and/or 10B through node 302. Video may be transferred from node 302 to display 304, or alternatively through 10B. The present invention contemplates that contextual information about the television 304 and/or the earpiece 10A and/or 10B may be used to assist in providing the communications. For example, information about the position of the earpiece 10 and information about the television 304 may be used to determine that the television is on and the user is likely watching the television. An incoming phone call may then be received. A ring tone transmitted to the earpiece 10B may be used to indicate the presence of the incoming call. In addition, caller-id, video transmission or related information may be displayed on the television 304 identifying the caller or the number from which the caller is calling or providing video transmission. The user may then press a button or switch on the earpiece 10B to answer the call or issue a voice command to answer the call or ignore the call. A video camera or other image sensor 305 associated with set 304 could optionally locate the earpiece 10A/10B to provide for video calls. Proximity data to video linkages may be provided by node 302.

Figure 8A:
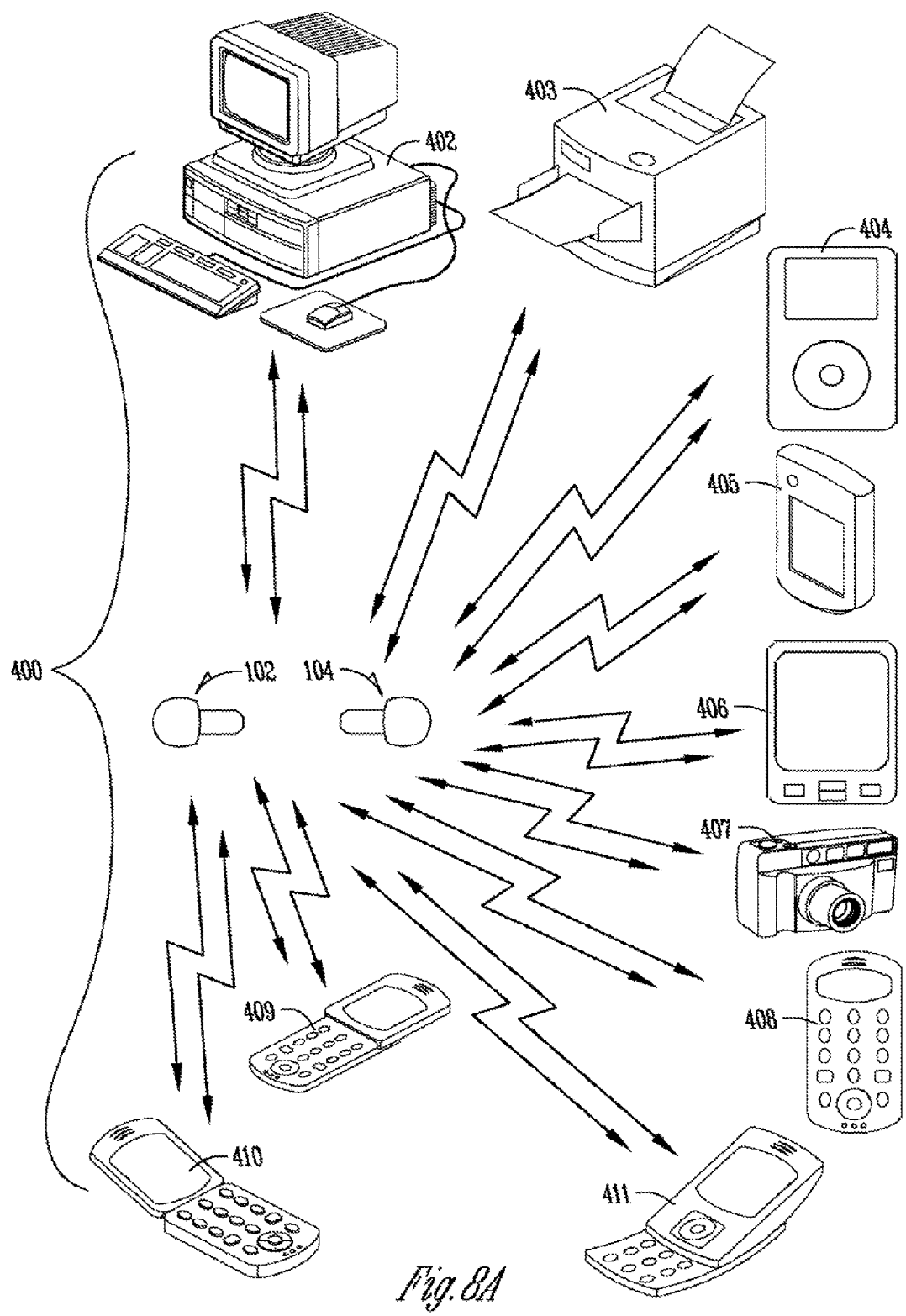
FIG. 8A is a diagram illustrating another embodiment of the invention using earpieces.

FIG. 8A illustrates another embodiment of the invention. FIG. 8A shows different types of devices that may include short range transceivers and be audio sources or recipients of audio transmissions from one or both of earpieces 102, 104. Preferably, two earpieces 102, 104 are used to provide a stereophonic system. In the system 400 shown, there is a computer 402, a printer 403, a portable entertainment device for audio and/or video 404, a GPS device 405, a camera 407, and a PDA 406, a candy bar type phone 408, and a flip type phone 410, a slide phone 409, a glide/slide phone 411. Each of these devices or others may communicate with one or both of earpieces 102, 104.

Figure 8B:
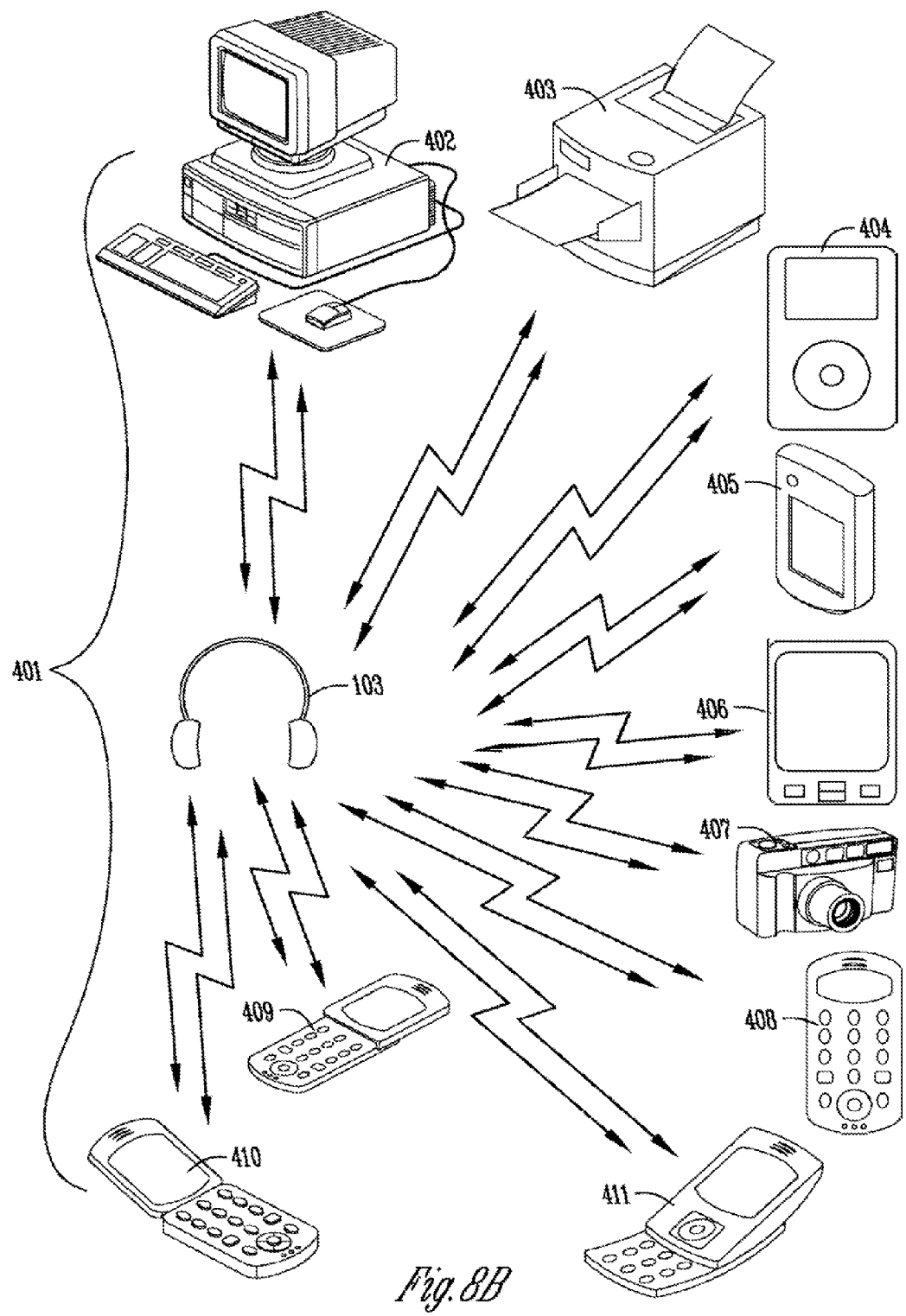
FIG. 8B is a diagram illustrating another embodiment of the invention using a headset.

FIG. 8B illustrates another embodiment of the invention. FIG. 8A shows different types of devices that may include short range transceivers and be audio sources or recipients of audio transmissions from a stereophonic system that includes a headset 103. In the system 401 shown, there is a computer 402, a printer 403, a portable entertainment device for audio and/or video 404, a GPS device 405, a camera 407, and a PDA 406, a candy bar type phone 408, and a flip type phone 410, a slide phone 409, a glide/slide 411 phone. Each of these devices or others may communicate with the headset 103. The headset 103 or one or both of the earpieces 102, 104 may include one or more bone conduction sensors in addition to one or more air conduction sensors to assist in reducing ambient noise or otherwise providing clearer voice signals.

In FIG. 9, a phone 700 is shown. The phone includes a phone housing 702. The phone also includes a first display area 704. There are a plurality of buttons 706 shown, preferably configured as a dial pad. There is a second plurality of buttons 708 also shown to provide for additional functionality. This second plurality of buttons 708 preferably includes a "buy" button 520. The purpose of the buy button 520 is to initiate the purchase of an audio recording. The buy button 520 is preferably a joystick type button that allows the button 520 to be pressed upward towards top member 712, downward to bottom member 714, leftwardly to left member 716, rightwardly to right member 718, as well as inwardly to one or two states. The buy button 520 may also be a double detent-type button where pressing the button with one level of pressure indicates a first state while pressing the button with a greater level of pressure indicates a second state.

In addition, the phone 700 may include one or more bone conduction sensors 701, 703. The bone conduction sensors 701, 703 are used to sense vibrations associated with the jaw bone, mastoid, or other bones of the user to thereby pickup voice sound vibrations. The resulting signals may be used to purify or filter sound to assist in eliminating ambient noise where desired and thereby improve the voice quality. The one or more bone conduction sensors 701, 703 may be located in various positions. The phone 700 may also include one or more air conduction sensors 709, 711 which may placed in various positions.

FIG. 10 illustrates another type of phone, similar to the phone of FIG. 9, but with an open, as opposed to closed, positioning capability. The first body 722 is hinged to the second body 724 through a hinge 720. As shown in FIG. 10, the phone includes a first body 722 and a second body 724. There is also a second display 726 shown. The present invention is not limited to the particular configuration of phone shown. The present invention contemplates numerous variations in the type of phone, including its physical configuration. One alternative embodiment is a phone with body 724 and one or more functions of the first body 722 accessed through the display 726. The phone also includes one or more bone conduction sensors 705, 707 which may be used to provide signals that may be used for purifying or filtering sound to assist in eliminating ambient noise or other undesirable sound and thereby improve voice quality. The one or more bone conduction sensors 705, 707 may be located in various positions. One or more air conduction sensors 739, 741 may be present and located in various positions. An addition display 727 is also present. Alternatively the display 727 and the display 726 may be formed of a single thin film display that extends across the hinge and is foldable.

Figure 11:
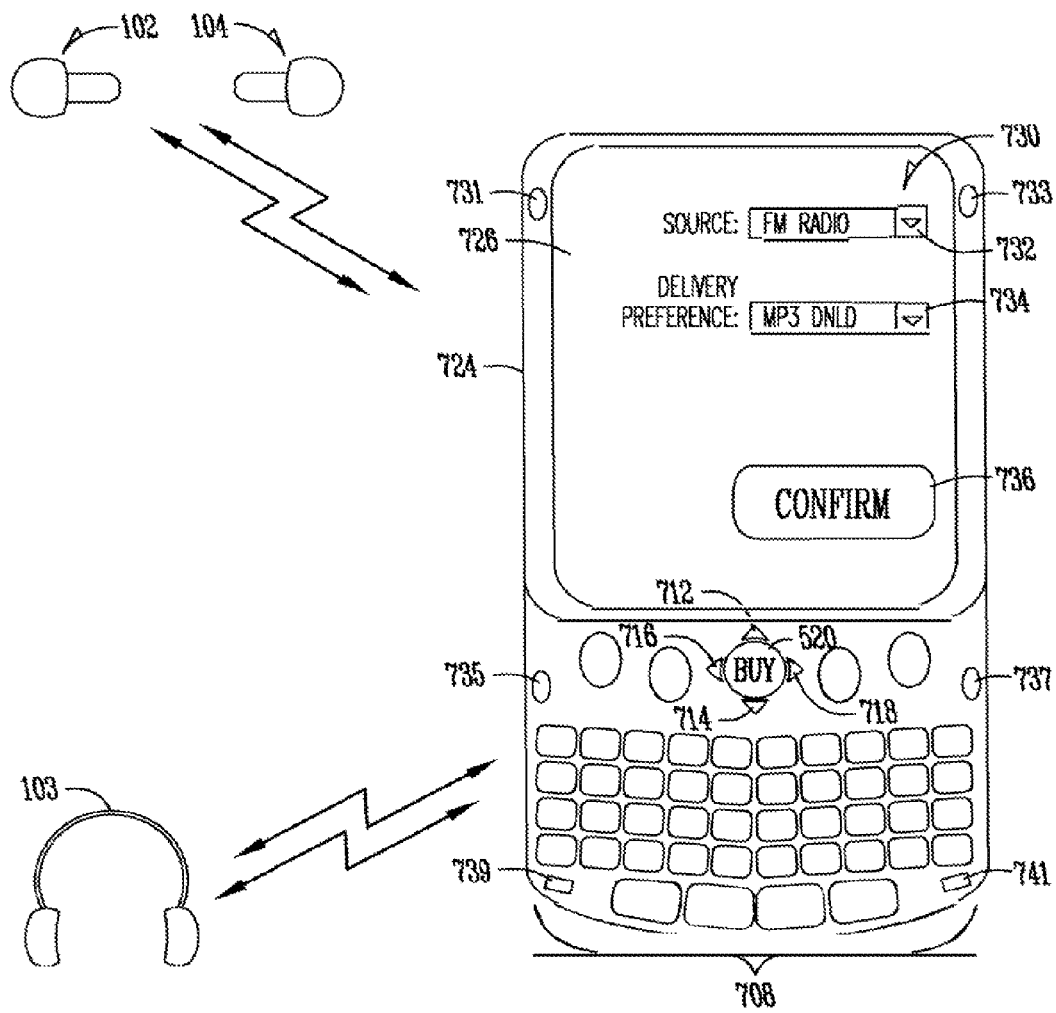

FIG. 11 illustrates another phone embodiment with a screen 730 on the display that allows the user to select the source of audio that the user wishes to purchase an audio recording of and the user's delivery preference. The combination of the buttons and the screen form one embodiment of a user interface. The display may be a touch-sensitive display. The user can select the source of audio or video encountered from the drop-down list box 732 and a delivery preference from the drop-down list box 734. The present invention contemplates any number of sources of audio can be used. These include sources of audio directly associated with the phone, such as an FM radio built-into the phone. The sources of audio that can be used also include sources of audio for which the phone receives identifying information. For example, as will later be discussed, the phone can receive identifying information for audio associated with public performances, local broadcasts, satellite broadcasts, other types of audio, or digital video. The identifying information can be communicated to the phone through short range transmission, such as through Wi-Fi, BLUETOOTH or UWB. Linkage to one or more earpieces or a headset have already been discussed. In addition, the phone may include one or more bone conduction sensors 731, 733, 735, 737 in addition to one or more air conduction sensors. The combination of one or more bone conduction sensors and one or more air conduction sensors may be used to reduce ambient noise when sensing voice sound information of a user. For example, signals detected by an air conduction sensor but not having corresponding or related signals detected by a bone conduction sensor may be filtered out of the voice signal. Of course other types of processing may be performed to utilize multiple bone conduction and/or air conduction sensors to provide the best voice signal.

In addition to specifying the particular source for the recording that the user wishes to purchase, the user can also select one of a number of delivery preferences. The delivery preferences are discussed herein in more detail, but can include download to a hard drive MP3 downloads, digital media such as CDs, DVDs, or audio cassettes, or other types of analog media. The present invention is not limited to a particular manner of delivery.

FIG. 11 also illustrates a "Confirm" button 736 which can be used to confirm a purchase. The present invention contemplates that pressing the buy button 520 once again can have the same effect as selecting "confirm." Audio may be transmitted to one or more of the earpieces 102, 104 or to headset 103 or through internal speaker systems.

Figure 12:
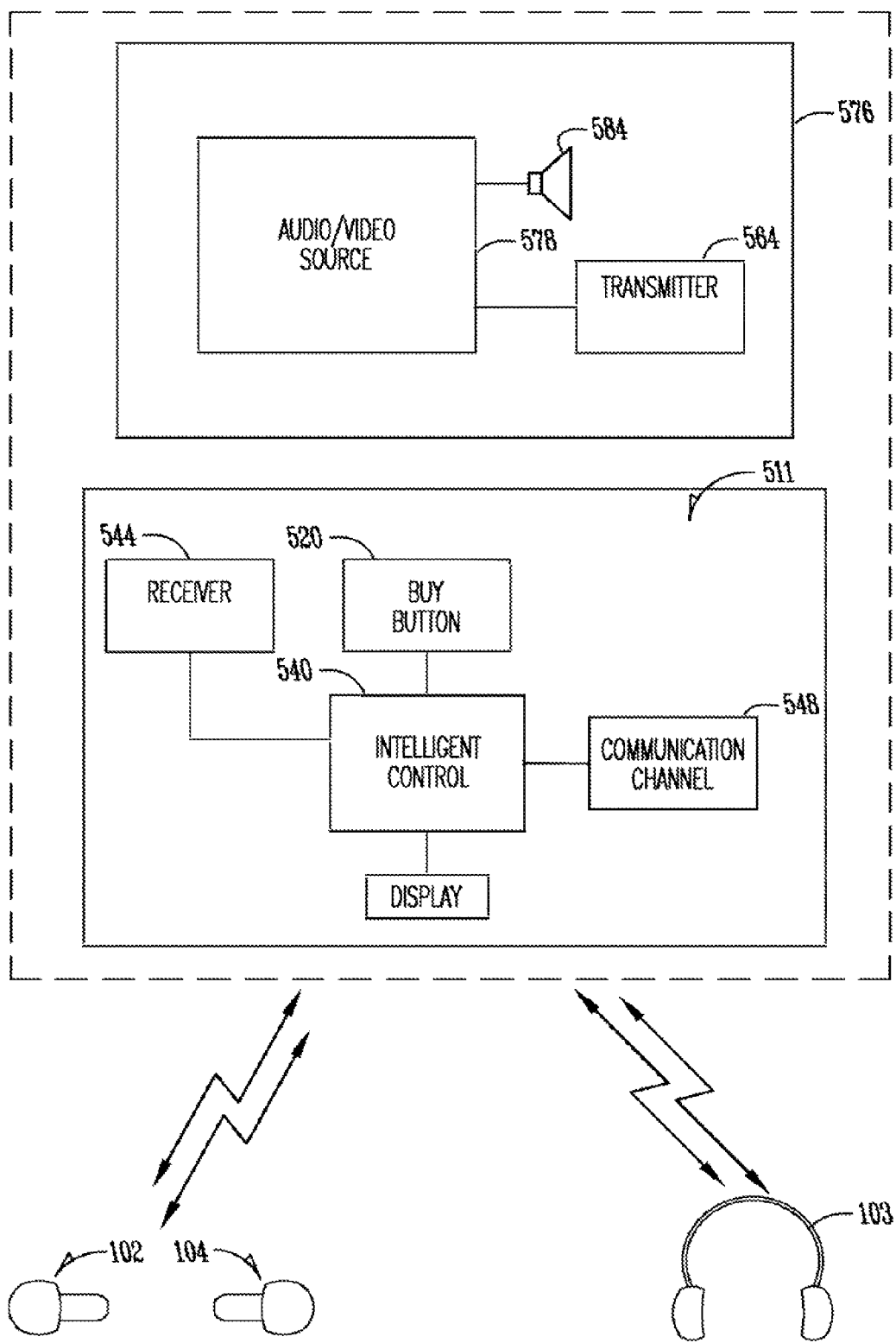
FIG. 12 is a block diagram of one embodiment of the present invention.

FIG. 12 illustrates a block diagram according to one embodiment of the present invention. In FIG. 12, a device 576 for producing audio or video is disclosed. The device 576 includes an audio and/or video source 578, a speaker 584, and a transmitter 564. The transmitter 564 transmits identifying information for the audio or video source 578 or identifying information for the audio being played by the audio or video source 578. Such a device can be used in any number of environments. For example, such a device can be present at amusement parks, or historical areas, or other places of interest. In such a use, the audio or video source can play an appropriate recording that may be of interest to a user. The transmission of identifying information allows a user to receive that information and then purchase a recording of the audio or video being played. Thus, it should be clear that the present invention contemplates use with any number of types of audio or video source and linkages to one or more earpieces or a headset.

In FIG. 12, a purchasing device 511 is also shown. The purchasing device 511 can be a phone. The purchasing device 511 includes an intelligent control 540. The intelligent control 540 is operatively connected to a buy button 520, a receiver 544, a display, and a communication channel 548. The receiver 544 receives identifying information from the transmitter 564 about an audio or video event. If a user desires to buy a recording of the audio or video event, the user can initiate a transaction, with, the buy button 520 to purchase an audio or video recording. The purchase can be transacted by sending appropriate information over the communication channel 548. Transmission to 102/104 or 103 of the signal is shown. Speakers in the purchasing device 511 may also be used.

Figure 13:
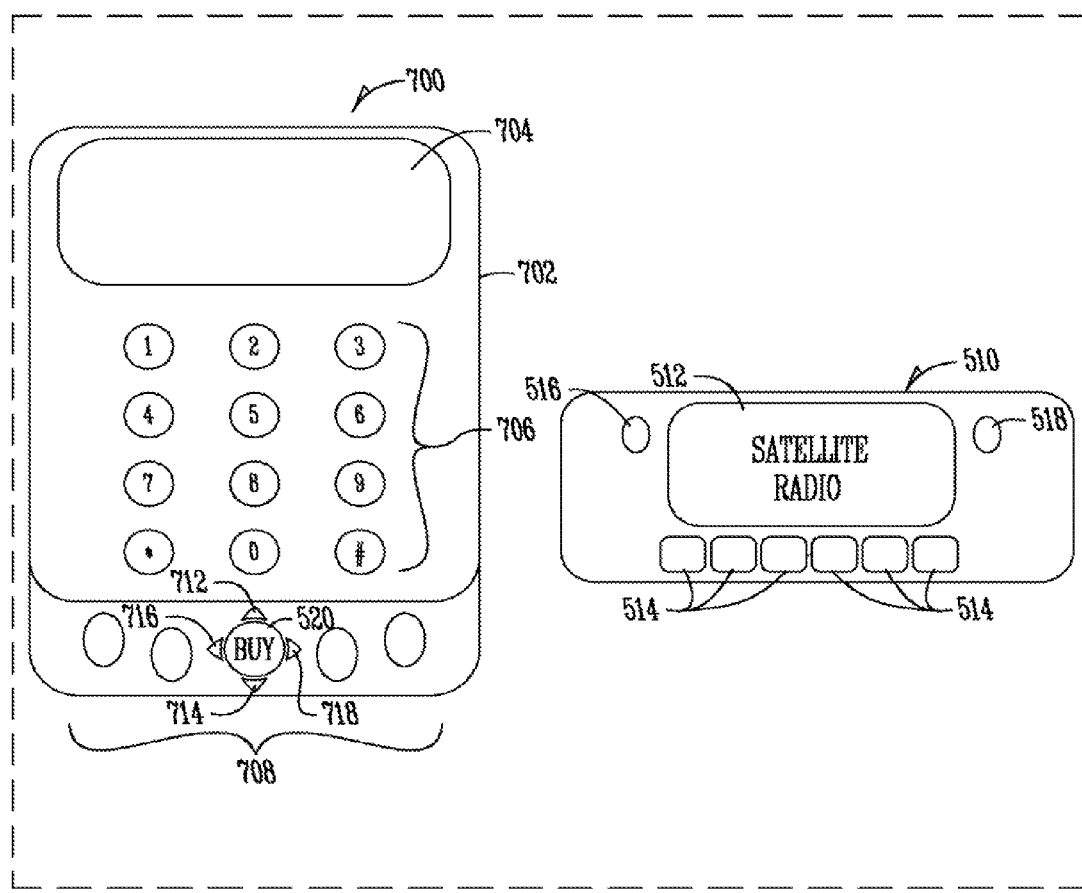
FIG. 13 is a pictorial representation of another embodiment of the present invention.

In FIG. 13, a satellite radio interface 510 is shown. The satellite radio 510 is preferably capable of receiving XM or SIRIUS transmissions. The satellite radio 510 includes a display 512, a plurality of radio controls such as radio control buttons 514 which can define preset channels and radio controls 516 and 518 which control channel and volume, respectively. The present invention contemplates that numerous other types or variations of radio controls can be used. The present invention provides for communication between the satellite radio 510 with the phone 700. Thus, a user can select the satellite radio as an audio source and thereby purchase audio events being played by the satellite radio. In such an embodiment, the satellite radio 510 communicates identifying information for the radio event to the phone 700. In this embodiment of FIG. 13, communication between the phone 700 and the satellite radio 510 is wireless and preferably through a short range transmission such as through BLUETOOTH, UWB, WiMax.

Figure 14:
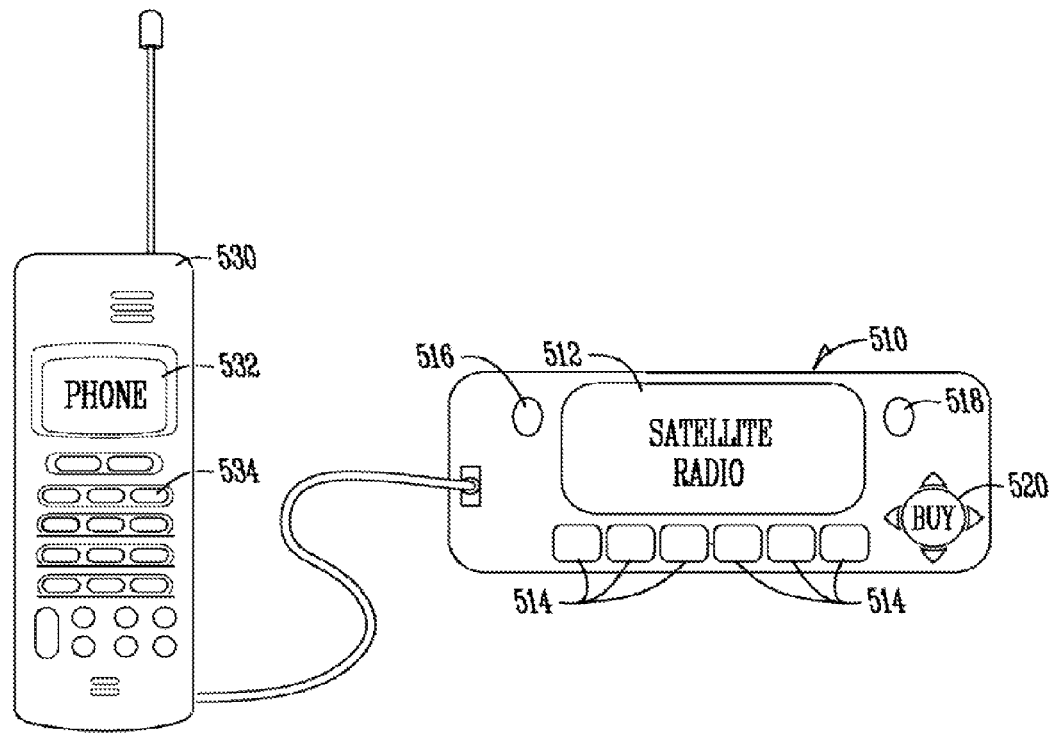
FIG. 14 is a pictorial representation of another embodiment of the present invention.

FIG. 14 illustrates an embodiment of the invention similar to that shown in FIG. 13. In FIG. 14, however, the satellite radio 510 includes a buy button 520, but does not include its own two-way communication channel. In such an embodiment, the satellite radio 510 can be operatively connected to a phone 530 having a display 532 and a keypad 534 via a wired connection. In such an embodiment, the present invention provides for proper interaction between the satellite radio and the phone for communicating purchase information from the satellite radio 510, using the phone 530.

In FIG. 14, there is a buy button 520. The buy button. 520 is conveniently placed as a part of the satellite radio 510. Thus, a listener of the radio can simply press the BUY button 520 to purchase a recording of a currently playing audio event. A telephone 530 with display 532 and keypad 534 is shown operatively connected to the satellite radio 510. The present invention contemplates that the purchase request can be transmitted over cellular or satellite network. When a request is made, audio event identifying information such as channel or station as well as buyer identifying information is transmitted over the network so that the purchase can be made. The present invention also contemplates that the purchaser may also need to verify the purchase through entering a code on the satellite radio or the phone 530 at the time of the purchase or may otherwise need to verify the purchase prior to purchase and delivery. Although a satellite radio and cellular telephone are shown, the present invention contemplates that other types of radios, phones, and other types of communications channels can be used. A satellite radio is preferred for a number of reasons. First, a satellite radio is a part of a large a network as opposed to independent radio stations. This simplifies the process of resolving purchase requests. For example, only a time (in some instances a time and location) and channel information is needed in order to determine the audio event associated with that particular time. Although the present invention contemplates other types of transmissions, such as FM radio transmissions, satellite radio presently provides an ideal platform for the present invention.

Figure 15:
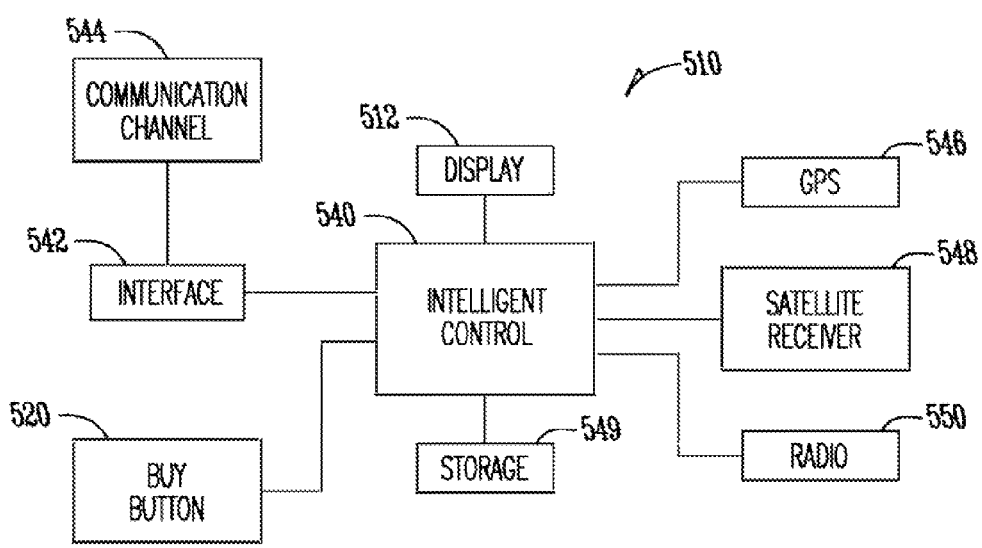
FIG. 15 is a block diagram of another embodiment of the present invention.

FIG. 15 provides a block diagram of one embodiment of the present invention. In FIG. 15, a satellite radio 510 is shown. The satellite radio 510 includes an intelligent control 540. The intelligent control 540 can include a processor, microcontroller, microprocessor, integrated circuit, or other type of intelligent control. Operatively connected to the intelligent control 540 is a display 512 and a satellite receiver 548 for receiving satellite radio signals. The satellite radio includes radio controls 550 which can be used for defining channel presets, changing volume, changing channels, and otherwise controlling radio functions. The buy button 520 is also operatively connected to the intelligent control 540. The buy button 5201 is considered to be a part of a user interface for purchasing a recording of an audio or video event. The present invention contemplates that instead of using buy button 520, the user interface can provide for receipt of voice commands to purchase a recording of an audio event or other types of user interface can be used.

A communications interface 542 is also electrically connected to the intelligent control 540. The communication interface 542 allows a communications channel 544 to be established. The communications interface 542 allows the intelligent control 540 to communicate over a communications channel 544 with a service that provides administration for purchase requests. The communications channel 544 can be a satellite link or a cellular communications channel or can be another type of communications channel, such as a SMS protocol channel that allows for the sending and receiving of short text messages. The communications channel may also be a communications channel that is associated with a motor vehicle, such as ONSTAR. It is preferred that the communications channel be bidirectional so that verification of receipt of purchase requests can be given or optionally, addition information can be requested. The type of communications channel used is in no way limited to the specific types of communication channels described herein as one skilled in the art will appreciate that a number of different types of communications channels can be used and the decision of which type of communication channels to use may be made based on a particular implementation of the present invention in a particular environment. Preset information regarding financial information of the purchaser may be stored and verified through confirmation pass codes stored with the satellite or cellular user contract.

An optional GPS receiver 546 is also operatively connected to the intelligent control 540. When present, the GPS receiver 546 provides accurate time and location information. Time and/or location information from the GPS receiver can accompany a purchase request to help identify a requested audio event along with channel identifying information. The present invention also contemplates that where satellite radio is used, the satellite radio transmissions includes identifying information for the audio or video event and that this identifying information can accompany a purchase request. In addition, updating of maps and other information associated with a navigation may be performed and appropriately billed for.

A storage device 549 is also operatively connected to the intelligent control 540. The storage device 549 is preferably a magnetic or solid state memory, such as a hard drive or a FLASH drive. The present invention, however, is not limited to the particular type of memory or storage device used. One of the advantages of having a storage device 549 is that music can be downloaded directly to the storage device 549 for future enjoyment. When music is ordered, a preference can be set to directly download the music to a storage device 549 associated within the vehicle so that the music will always be available to the driver of the vehicle.

Figure 16:
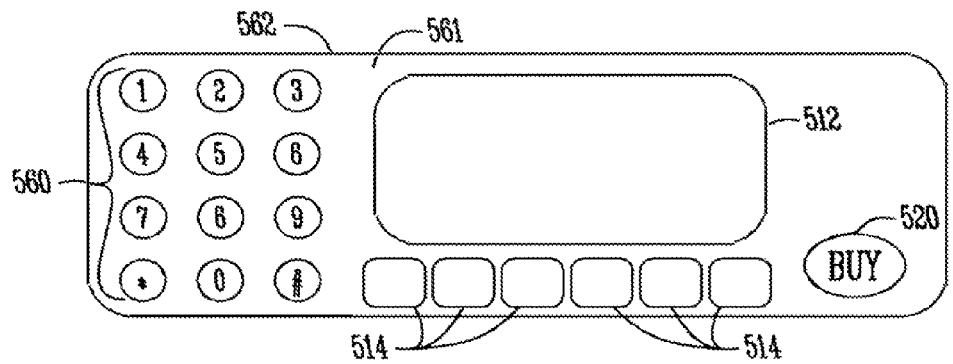
FIG. 16 is a pictorial representation of yet another embodiment of the present invention.

FIG. 16 illustrates another embodiment of the present invention. In FIG. 16, a device 562 has a housing 561 that houses both a satellite radio and a voice communications transceiver. In FIG. 16, the device includes a display 512 with radio controls 514 and a buy button 520. A telephone keypad 560 is also shown. Alternatively, the voice communications transceiver, instead of being integrated with the satellite radio, can be interfaced to the satellite radio through a cable or operatively connected through BLUETOOTH, UWB, infrared, or other types of short range wireless transceivers. GPS and other video information can be displayed on display 512.

Figure 17:
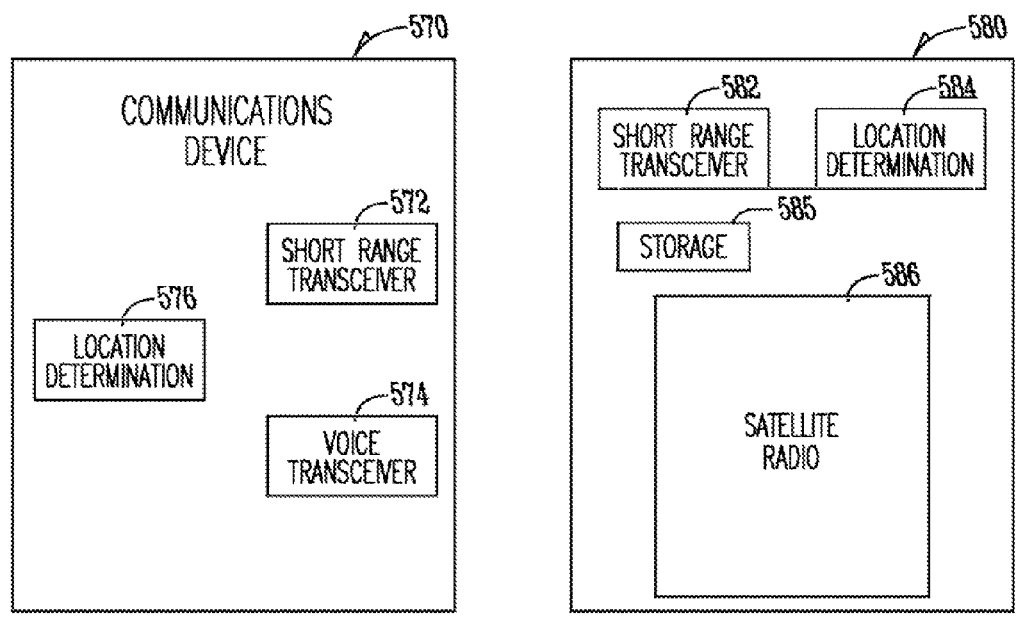
FIG. 17 is a block diagram of another embodiment of the present invention.

FIG. 17 illustrates another embodiment of the present invention. In FIG. 17, a device 580 includes a satellite radio 586, a short range transceiver 582, and an optional local determination unit 584. The short range transceiver can be a BLUETOOTH transceiver, a UWB transceiver, or other type of short range transceiver. The optional location determination unit 584 can be a GPS unit or other type of location device. The short range transceiver 582 is in operative communication with a short range transceiver 572 associated with a communications device 570. The communications device 570 also includes a voice transceiver 574. Preferably the communications device 570 is a phone or smart phone, but the present invention contemplates that other types of communications devices can be used. The link between the short range transceiver 572 of the communication device 570 and the short range transceiver 582 of the device 580 allows purchasing requests and purchase verification information concerning audio events played by the satellite radio 586 to be communicated over a communications channels such as that provided by voice transceiver 574.

The present invention contemplates that the devices 580 can be housed within a vehicle, including being housed within a dashboard of a car. The device 580 can also include a storage device 585. The storage device 585 is a memory such as a magnetic memory, a hard drive, a flash drive, or an optical drive. The present invention contemplates that works such as songs or video can be stored directly on the storage device 585 so that a listener can order a selection being played on their satellite radio 586 and have the selection delivered to the storage device 585.

Figure 18:
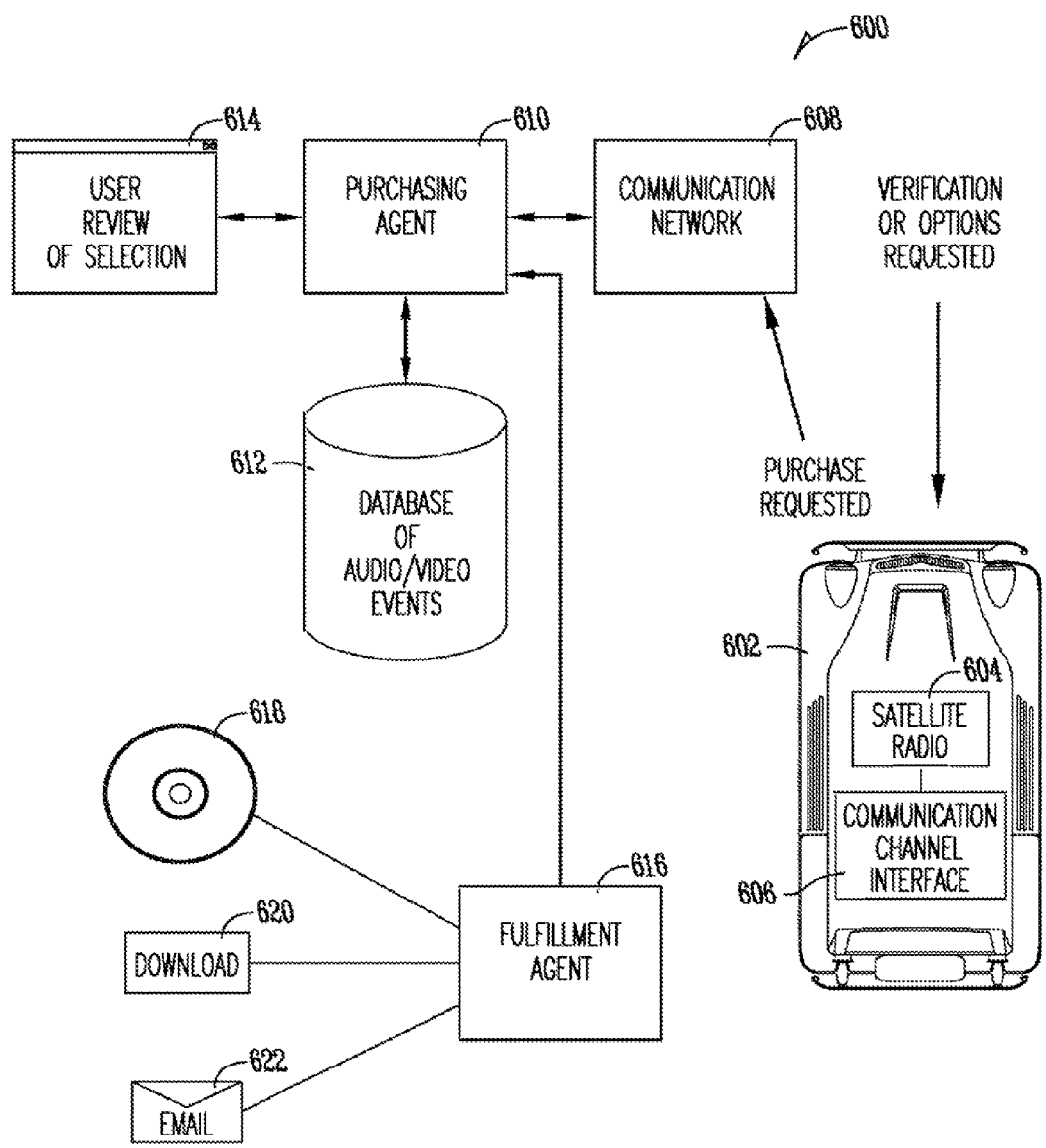
FIG. 18 is an overview of a system of one embodiment of the present invention.

FIG. 18 provides an overview of one embodiment of the system of the present invention. In FIG. 18 a system 600 is shown. A motor vehicle 602 includes a satellite radio 604. A communications channel interface 606 is operatively connected to the satellite radio 604. A purchase request is made over the communications channel to a communications network 608. Optionally the communications network can send verification requests or options requests to the communication channel interface 606. The communications network 608 is also operatively connected with a purchasing agent 610 which can include humans, computers, software, and combinations of computers and software. The purchasing agent 610 can access a database of audio or events 612. Thus, when given proper identifying information about an audio or video event—such as the identifying information included in a purchase request, the purchasing agent can determine additional information about the audio or video event.

A user interface for review of selections 614 is optionally provided. The present invention contemplates that instead of buying a selection immediately, the user can instead place the information concerning a particular audio event into a shopping cart or otherwise flag the audio or video event for potential purchase. The user can then later review these selections to determine if the user wishes to purchase the particular selections. Once a user selects the audio or video events to purchases, a fulfillment agent 616 which may be automated in whole or in part provides for fulfillment of the purchases. The present invention contemplates that the audio events can be recorded onto digital media such as a CD or DVD 618 (or other digital media). Alternatively, the audio events can be made available to a user as downloads 620 or can be sent, such as attachments to an email 622 that is sent to the user or other recipient. Of course, the present invention contemplates that delivery may be made in any number of forms, whether electronic or physical.

FIG. 19 illustrates one embodiment of a user interface for review of selections. The present invention contemplates that a user can review the selections they have made prior to purchase or set other purchasing options. These selection options can be accessed in any number of ways, including being reviewed online on a web page or a wireless web page. These selection options can include credit card or account information as well as information about each audio event that has been selected. Examples of the type of audio event information can include a category of music 654, a name 656 of a song, the name of an artist 658, the channel 660 on which the song was played, and a time 662 that the song was played or the time the song was selected. In addition, a price 664 for a recording of the music event can also be displayed.

The user can also make selections regarding how the recordings of the music events should be delivered. For example, the present invention contemplates that the user can have each song delivered on a separate piece of digital media. Alternatively, the user can group one or more selections on a piece of digital media such as a CD or DVD by selection option 666. Alternatively, the user can have one or more selections delivered via email or otherwise by selecting option 668. The present invention also contemplates that the selections can be automatically download to a memory, such as a hard drive associated with a computer or a phone, or a satellite receiver by selecting a send as download to hard drive or other storage medium option 669. Then the user can finalize the order by selecting the order button 670.

The present invention contemplates that the user can preset these selections so that the user need not review this information. The user can, for example, set preferences such that every time a buy button is pressed the audio event is delivered as a CD or DVD or delivered as an MP3 to email. The present invention is flexible in this regard and contemplates numerous variations that would accommodate the preferences of a particular user.

It is preferred, that when the purchasing device is phone, that there be simple presets within the phone so that one need not even review any information after initiating a purchase. Instead, the purchase automatically occurs, and delivery is made, according to the user's presets.

Figure 20:
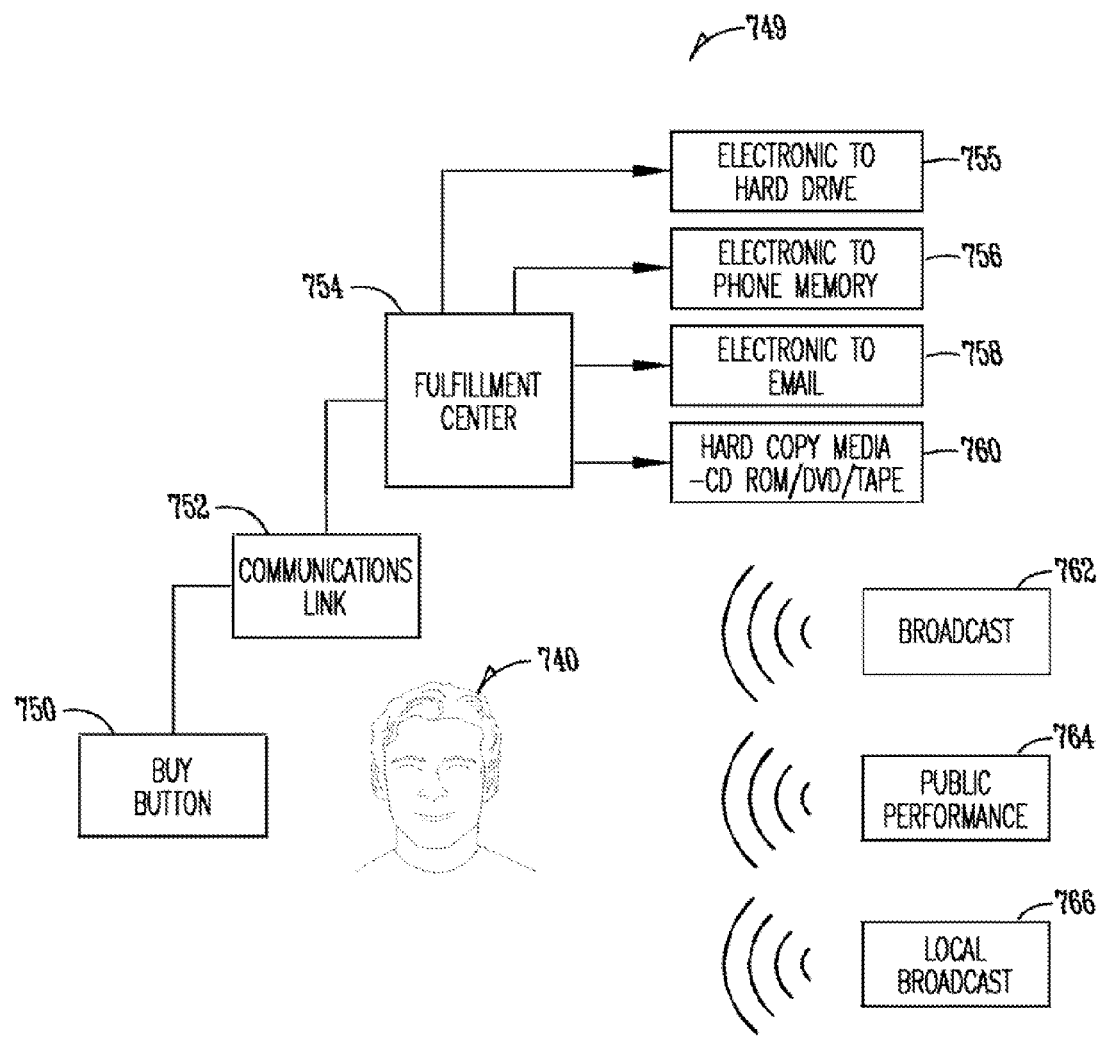
FIG. 20 is an overview of a system of another embodiment of the present invention.

FIG. 20 illustrates another embodiment of a system 749 of the present invention. In FIG. 20, a user 740 is shown. The user 740 is in proximity to one or more audio or video sources. The audio or video sources produce audio or video of interest to the user 740. The user indicates their desire to purchase a recording of an audio or video event. The identifying information for the audio or video event and delivery information is then transmitted trough a communications link 752 to a fulfillment center 754. The fulfillment center then provides for delivery according to the user's preferences. The present invention contemplates that delivery can be performed in any number of ways. For example, the delivery can be electronic delivery to phone memory 756, electronic delivery to an email account 758 associated with the user, or physical delivery of a hard copy media 760, such as, but not limited to a CD-ROM, DVD, or tape. The electronic delivery can also be electronic delivery to a storage device 755, such as a hard drive, associated with a vehicle.

As indicated in FIG. 20 the present invention is not limited to any particular type of audio or video source. For example, the audio source can be a broadcast 762, such as associated with a radio or video broadcast. Alternatively, the audio source can be a public performance 764. For example, a user can request an audio recording of an audio track for a song at a movie or concert or a video recording of the event. Alternatively, the audio or video source can be a local broadcast 766 such as may be confined to a local vicinity, such as music playing at an amusement park, or in a historical district that a user finds of interest.

One skilled in the art will appreciate that the present invention provides benefits and advantages beyond those that most directly affect a user of the system. For example, each purchase (or selection for potential purchase) of a music event is directly tied to a channel and a time. Therefore, recording each request and each purchase provides valuable data for the purchasing agent. This data can be used to determine relationships between time of day and purchasing, particular channels and purchasing, and particular music events, and purchasing. This data can then be used to determine which music (or other audio event) to play at what time in order to increase purchases of that music. Also, this data can provide some insight into which music or other audio or video event is not of particular interest and which music or other audio or video event is. Thus, each purchase request can be recorded for later data analysis. This data analysis can be used to recommend particular artists, songs, performances, videos, channels, or other products or services of potential interests to the user. Therefore, the user or purchaser of a recording of an audio or video event will not be the only one who can benefit from the present invention.

Figure 21:
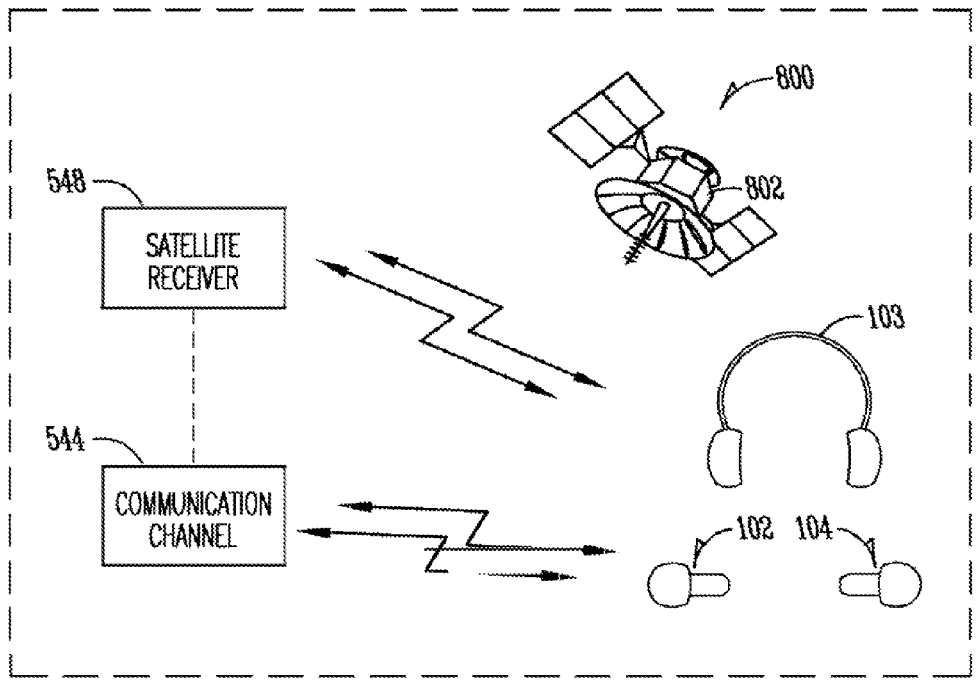
FIG. 21 illustrates one embodiment of a satellite system used in various embodiments of the present invention.

FIG. 21 illustrates communications in a satellite system 800. In FIG. 21, a satellite system including at least one satellite 802 is in communication with a satellite receiver 548. The present invention contemplates that the satellite 802 can be adapted for communication of different types of information, including audio and/or video transmissions. A communications channel 544 is operatively connected to the satellite receiver 548. The present invention contemplates that an earpiece or headset may include the satellite receiver 548.

Figure 22:
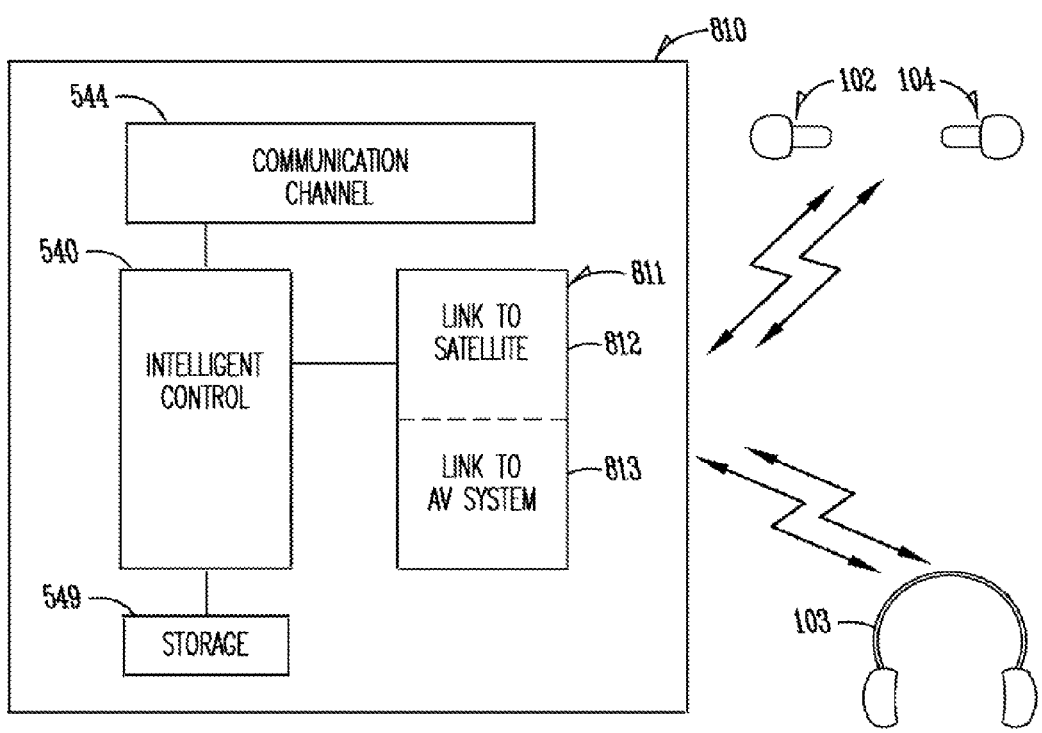
FIG. 22 illustrates one embodiment of the present invention for receiving satellite transmissions.

FIG. 22 illustrates one embodiment of a system 810 of the present invention. In FIG. 22, a communication channel 544 is shown. The communication channel 544 is operatively connected to an intelligent control 540. The intelligent control is operatively connected to storage 549. The storage 549 can be a hard drive, a solid state memory, a magnetic memory, or other type of storage device. The intelligent control 540 is also operatively connected to an interface system 811. The interface system 811 includes a link to satellite 812 and a link to an audio or audio-visual system 813. The communication channel 544 can be a cellular communication channel. The link to satellite 812 can be a link to a satellite receiver. The link to AV system 813 can be a link to a vehicle entertainment system.

Figure 23:
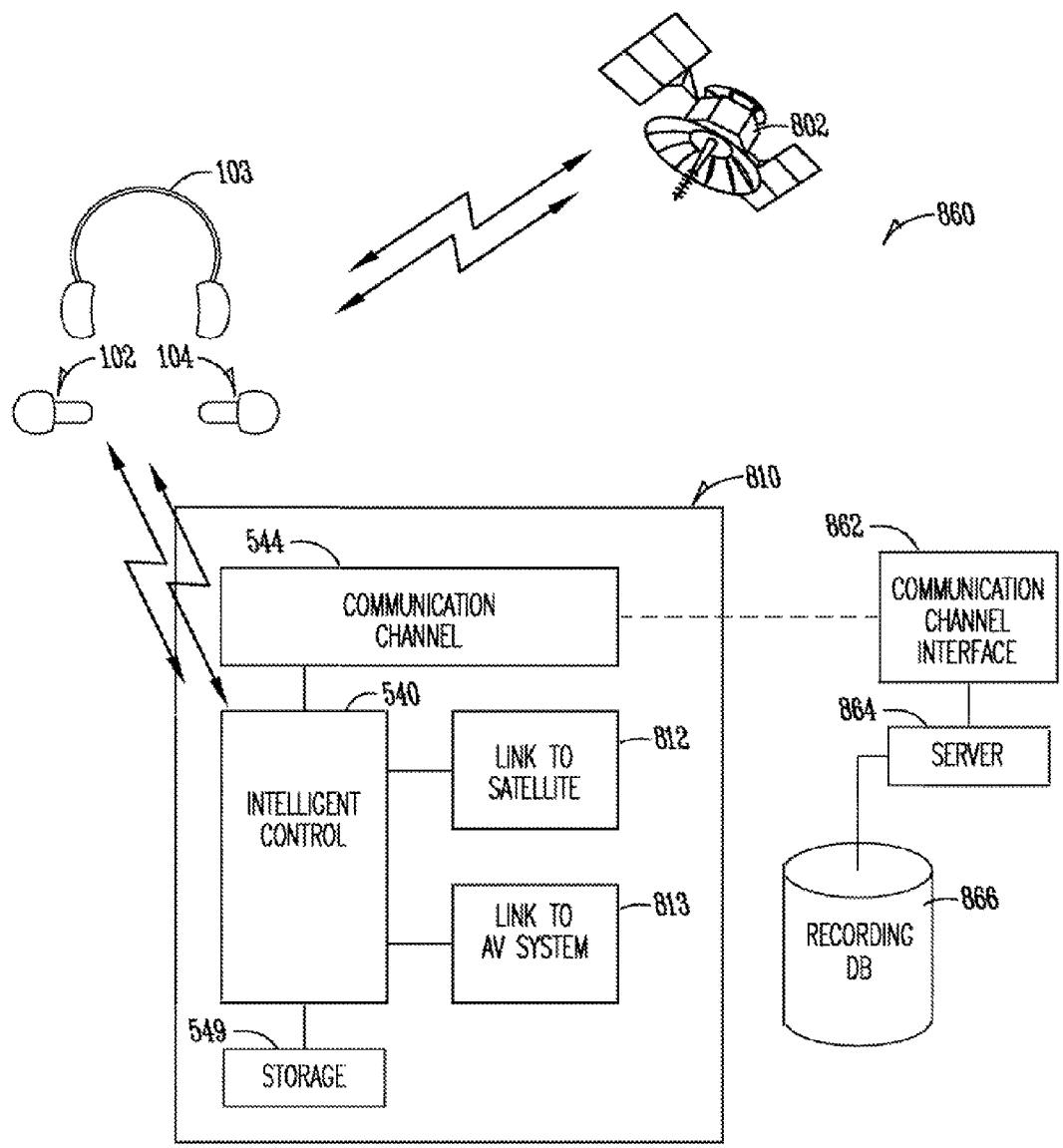
FIG. 23 illustrates another embodiment of the present invention for receiving satellite transmissions.

FIG. 23 illustrates another embodiment of a system 860 of the present invention. In FIG. 23, a satellite 802 is shown. There is a link 812 to the satellite 802. The link 812 may be a link to a satellite receiver. The link 812 is operatively connected to an intelligent control 540 which may be a computer, processor, microcontroller, or other type of intelligent control. The intelligent control 540 is also operatively connected to an audio-visual system 813 which may include speakers and/or a video display. The AV system may be of a kind typically associated with a vehicle such as a car or a plane. Alternatively, the AV system may be of a type associated with a home entertainment system. The AV system may include one or more speakers, video displays, and related equipment. The communication channel 544 is in operative communication with a communication channel interface 862. The communication channel 544 is preferably a wireless communication channel such as that associated with a cellular phone, however, the communication channel 544 may be of other types. The communication channel interface 862 is operatively connected to a server 864 which is operatively connected to a recording database 866. Thus, for example, a user can access a satellite radio or satellite television system. If the user finds a transmission of interest, the user can request that the transmission be purchased as a recording and in then the recording can be delivered from the recording database 866 or other location to the user. The recording can be delivered electronically to the communication channel 544, electronically through other means (such as over a high-speed Internet connection), delivered on a physical storage medium such as a CD, DVD, solid state memory, or otherwise.

Figure 24:
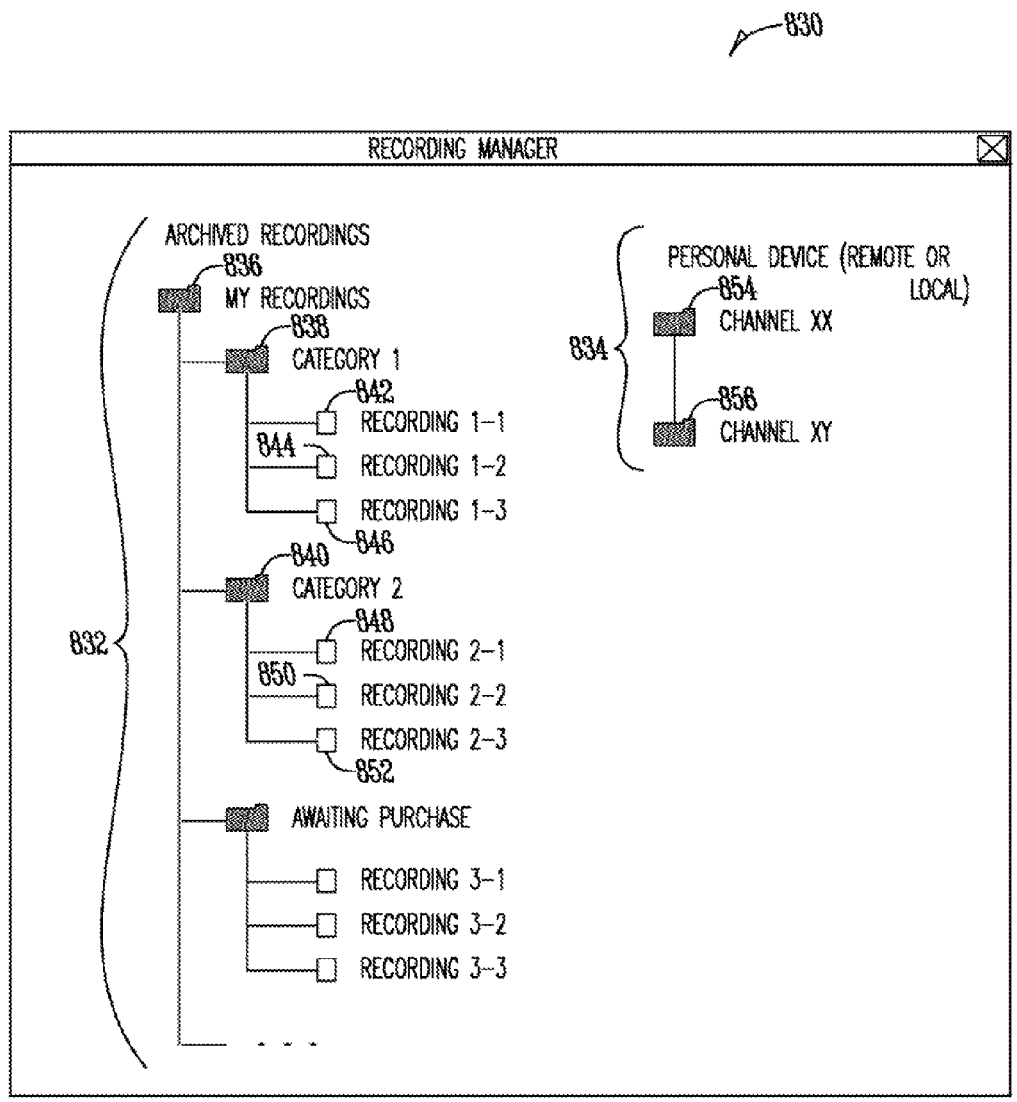
FIG. 24 illustrates one embodiment of a user interface according to the present invention.

FIG. 24 illustrates a representation of a screen display 830 according to one embodiment of the present invention. In FIG. 24, a recording manager software is executed on a computing device. The recording manager allows one to store and organize recordings. The recordings can be audio recordings, video recordings, or other types of recordings. As shown in FIG. 24, recordings can be organized into archived recordings 832 through the use of file folders or another filing or organization system. "MY RECORDINGS" 836 is shown has a file holder which includes a "CATEGORY 1" 838 and a "CATEGORY 2" 840 sub folders. Within "CATEGORY 1" subfolder 838 are recordings 842, 844, 846. Within "CATEGORY 2" subfolder 840 and recordings 848, 850, and 852. Note that the screen display 830 also provides for organizing recordings which have been marked for purchase but have not yet been purchased or recordings that have been purchased. For example, recordings 834 can be associated with transmissions heard over a satellite radio system or a satellite televisions system. One way of organizing these transmissions is to have a separate folder for each channel or station. For example, a first folder 854 is associated with a first channel and a second folder 856 is associated with a second channel. This allows one to keep recordings organized. For example, if the recordings are songs, then the user may already associate one of the channels with blues music and another channel with jazz music. Organizing music recordings based on the channels where the music was first heard provides a convenient method for organization.

Figure 25:
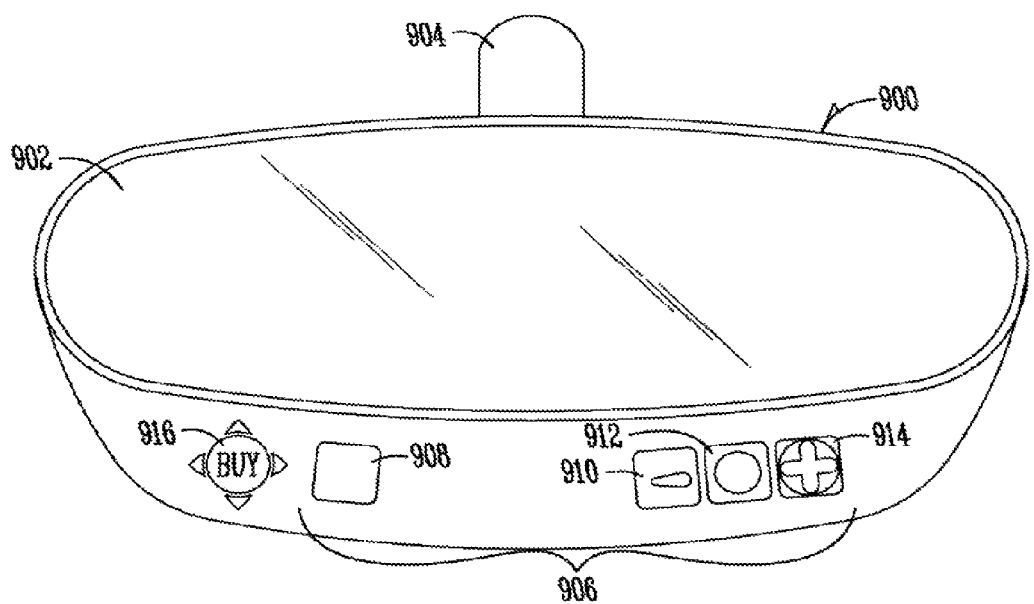
FIG. 25 illustrates one embodiment of a system of the present invention installed on a rearview mirror of a vehicle.

FIG. 25 illustrates another embodiment of the present invention adapted for use in a vehicle. In FIG. 25, rear view mirror 900 hangs from support structure 904. The rear view mirror has a mirror surface 902 and a user interface panel. The user interface panel includes conventional manual inputs 906 as may be associated with an ONSTAR system or other vehicle navigation system, including buttons 908, 910, 912, and 914. In addition, there is a buy button 916. The buy button 916 allows a user to purchase a product or service. The buy button 916 is preferably adapted to communicate over a communication system associated with ONSTAR or other vehicle safety and security system or telematics system. The buy button 916 need not be located on the mirror, but may be located on a console or elsewhere.

Figure 26:
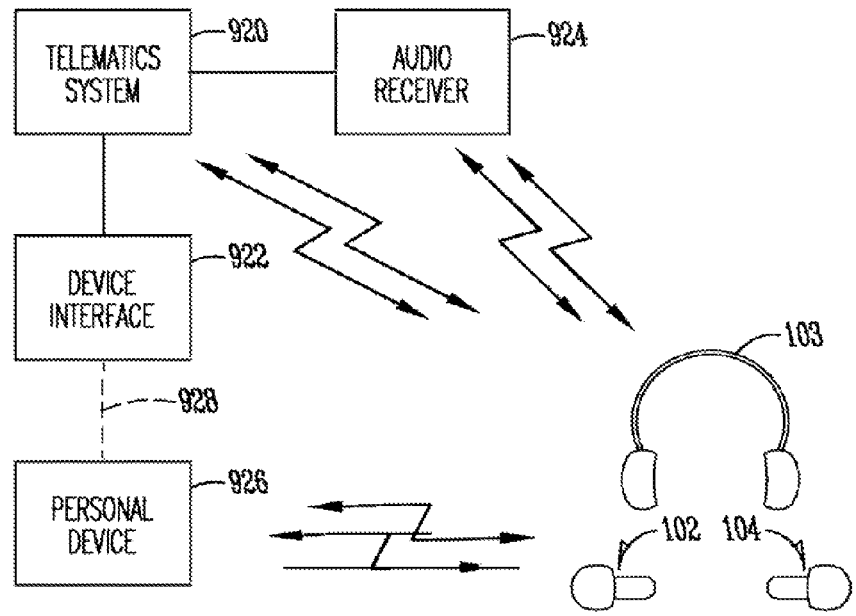
FIG. 26 is a block diagram of one embodiment of the present invention.

As shown in FIG. 26, a telematics system 920, such as associated with the manual inputs 906 of FIG. 25, is operatively connected to an audio receiver 924, such as a satellite radio receiver. Preferably, the audio or video receiver 924 is a satellite radio receiver that can communicate channel information to the telematics system 920. A device interface 922 is operatively connected to the telematics system 920 and a personal device 926 via a connection 928. The connection 928 may be a wireless connection. Thus, for example, a user can plug (or otherwise connect) a portable MP3 player device or phone into their vehicle's telematics system 920. The user can use the telematics system 920 to communicate purchase decisions over the telematics system 920. Where the services are audio and/or video recordings, the services can be delivered to the personal device 926. The present invention contemplates other types of services may also be communicated. Linkages to a wireless earpiece or headset have been previously discussed.

Figure 27:
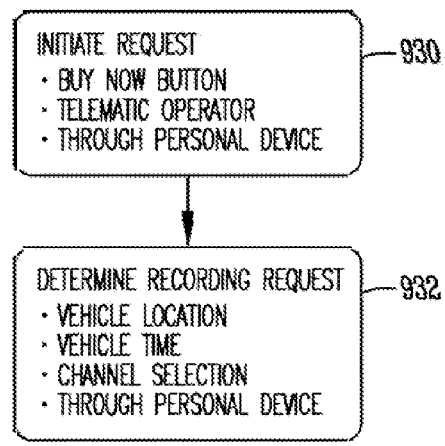
FIG. 27 is a flow diagram according to one embodiment of the present invention.

FIG. 27 illustrates one embodiment of the methodology of a system such as that presented in FIGS. 25 and 26 or variations on such a system. In step 930, a request is initiated to make a purchase. Preferably the request is initiated through use of the buy now button of a telematic system. Alternatively, the request can be initiated through a request to a telematic operator or through a personal device operatively connected to a telematic system. As shown in step 932, where the request is for a recording, a determination is made as to information necessary to identify the request. The request can include vehicle, location, vehicle time, channel selection, and whether the request is through a personal device. For example, if the request is a request for a recording of a song being played over a satellite radio and the request is made during the song, then knowing the channel selection is sufficient information to identify the song. If the request is associated with a FM radio, then knowledge of time and channel is enough information to identify information. The present invention further contemplates that the request can be made in response to a radio advertisement for a product. Or the request can be made in response to a billboard advertisement for a product in which case vehicle location would be required to identify the request. Where more than one possible request exists for a location, the user can be prompted contemporaneously or after the fact for to select from a list of potential selections. Where the request is made through a personal device, the communications channel associated with the personal device can be used, but the personal device can access channel information, location information, or other information from the radio receiver and telematics system.

Figure 28:
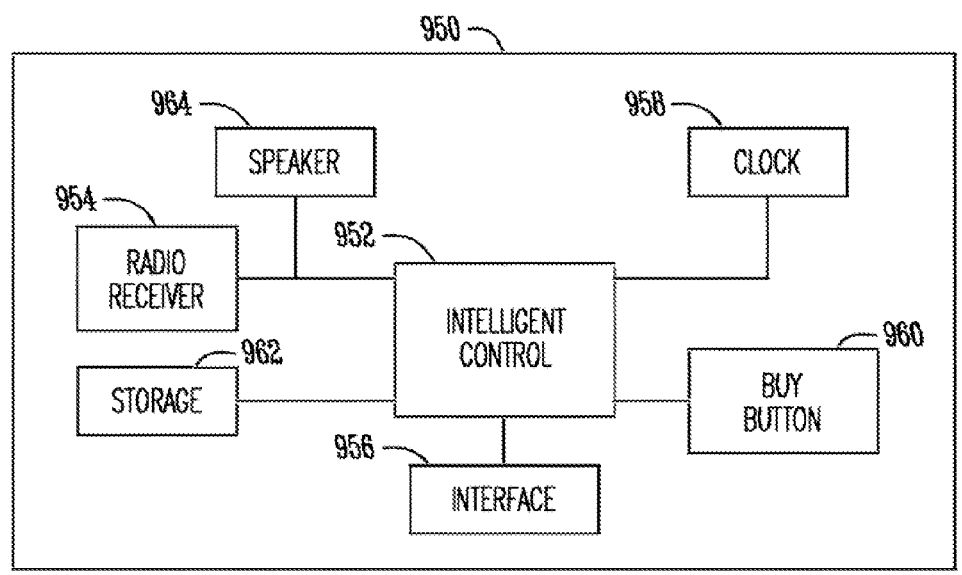
FIG. 28 is a block diagram according to another embodiment of the present invention.

FIG. 28 illustrates one embodiment of a system 950 of the present invention. In FIG. 28, an intelligent control 952 is operatively connected to an interface 956. A buy button 960 is operatively connected to the intelligent control. A clock 958 is operatively connected to the intelligent control. A storage device 962 is operatively connected to the intelligent control 952. A radio receiver 954 is operatively connected to the intelligent control and a speaker 964 is operatively connected to one or more of the radio receiver 954 and the intelligent control 952. The system 950 is one embodiment of a system that can be used within a vehicle. The interface 956 is a communications interface which can be implemented through cellular communications, through a communications channel of a separate personal device, through a telematics communication channel or otherwise including through Bluetooth, UWB, or otherwise.

Figure 29:
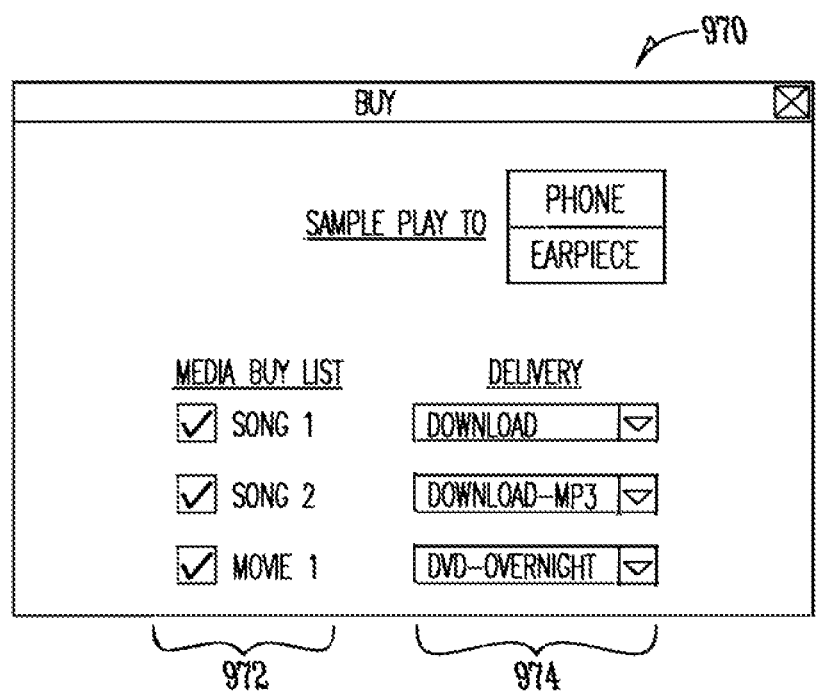
FIG. 29 is a screen display for buying a media product.

FIG. 29 is one embodiment of a screen display 970 which can be displayed on a personal device such as a phone. The screen display 970 provides a media buy list that allows a user to select one or more media purchases based on recent requests. A user can check or un-check various selections. In addition, the user can specify the manner of the delivery through options 974. The purchases can be delivered via download to one or more different file formats or the purchases can be placed on physical media and delivered. The present invention contemplates numerous variations in the type of delivery options which may, in part, be based on the type of purchase. In addition to purchases, samples can be accessed or delivered for no cost.

Figure 30A:
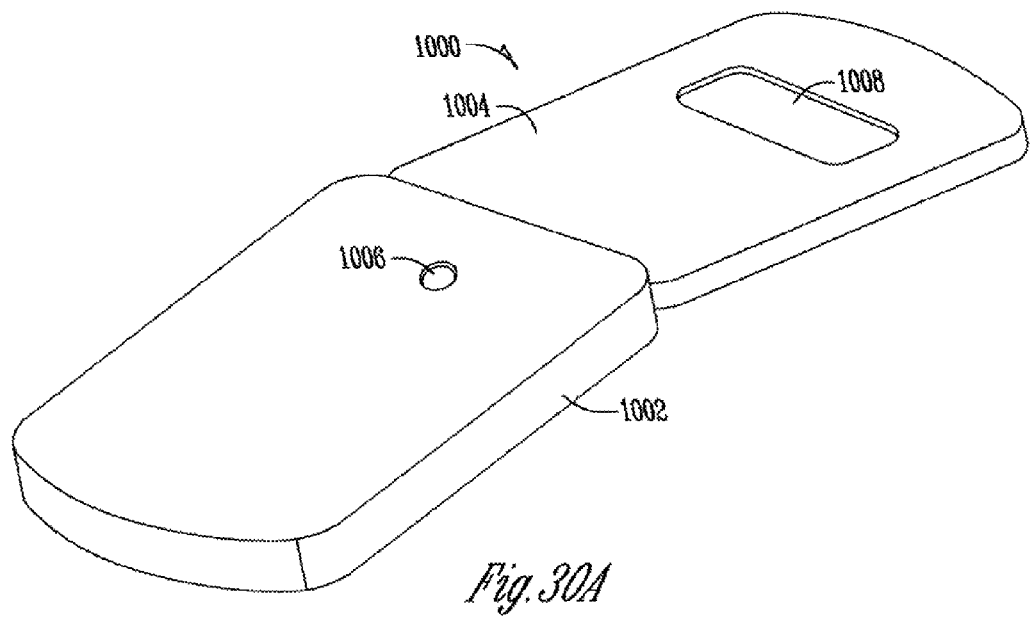
FIGS. 30A-D illustrate one embodiment of a cell phone.
Figure 30B:
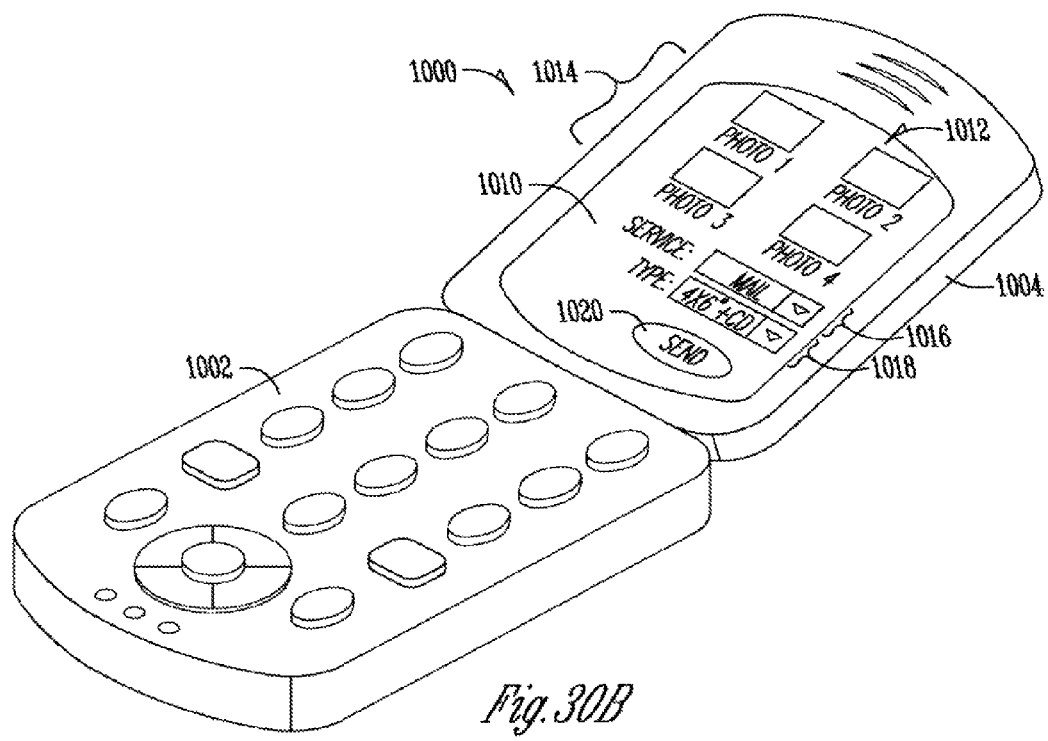

The present invention provides for a personal device such as a cell phone to be used for other types of purchases as well. FIGS. 30A through 30D illustrate a cell phone 1000 adapted for different types of products or services. As shown in FIG. 30A, phone 1000 has a first body 1002 and a second body 1004 which are operatively connected. There a display 1008 on the outside of the cell phone 1000. In addition, a video camera 1006 for taking still shots or video is incorporated into the phone 1000. In FIG. 30B, a second screen 1010 is shown with a screen display 1012. The screen display 1012 shows a set of photos 1014 which have been taken with the phone 1000. The software allows a user to select a service 1016 associated with the photos, delivery options 1018, if appropriate, and a selection 1020 to initiate purchase. The button 1020 is labeled as "Send", however, this button, where present, may also be labeled "buy" where appropriate. The present invention contemplates that some purchases may be without cost, such as those providing samples or provided as a part of a promotion, or otherwise. Upon purchase, photos stored on the phone are communicated over a cellular network for processing. This is highly advantageous to a user because it allows a user to have their photos physically delivered or available for pick up on CD, or in prints of one or more sizes.

Figure 30C:
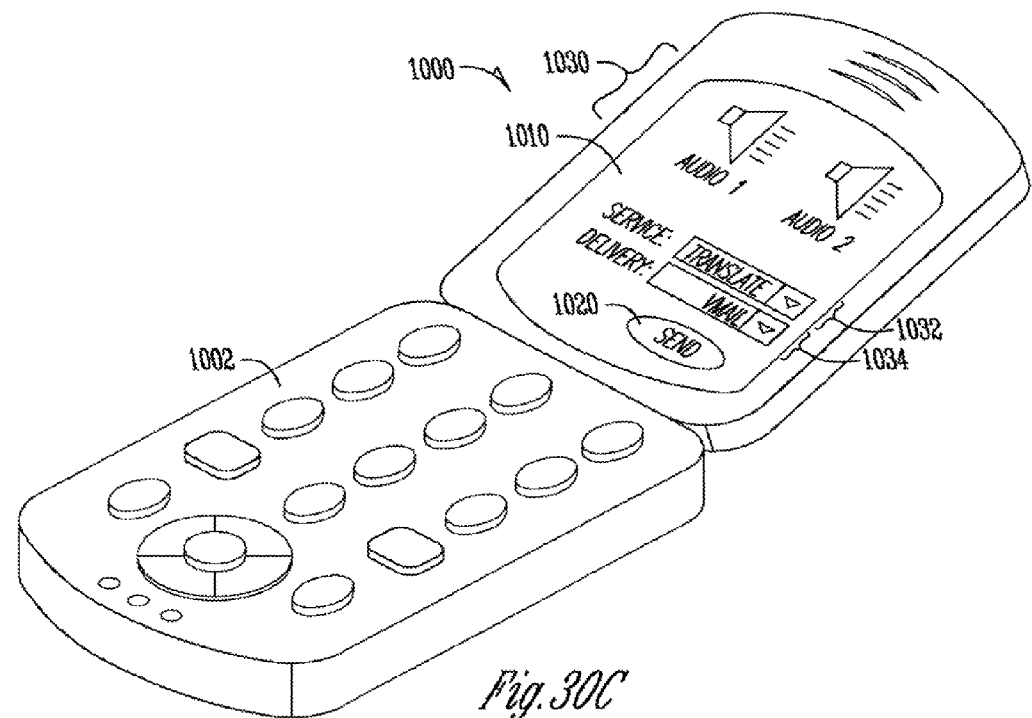

FIG. 30C illustrates another embodiment of the present invention. On the display 1010 of the phone 1000 are audio selections 1030 such as those recorded with a voice recorder associated with the cell phone. The service options 1032 include merely storage of the voice recordings, translation of the voice recording, or other types of service. The delivery options 1034 include via voicemail, real-time to the phone, or email if translation service is desired, via CD or DVD if a physical service is desired. Of course, where the phone 1000 is associated with one or more earpieces or headsets, audio signals may be sent to speakers associated with the one or more earpieces or headsets instead of being output on one or more speakers of the phone 1000.

Figure 30D:
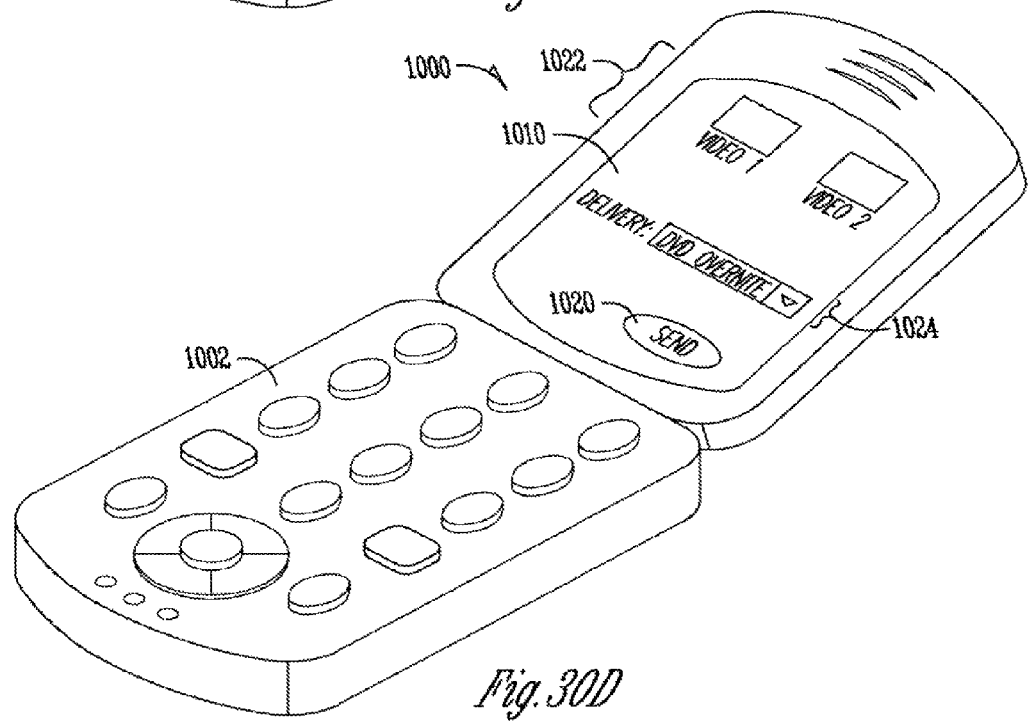

FIG. 30D illustrates another embodiment of the present invention. As shown in FIG. 30D, different video selections 1033 are available. The service or deliver options 1024 include delivery on a DVD, Video-CD, download, email or other types of options.

The present invention contemplates numerous additions, alternatives, and options. That which has been disclosed is merely exemplary. The present invention is not to be limited to or by the specific embodiments disclosed herein.

What is claimed is:

1. An apparatus comprising:
an earpiece housing;
an intelligent control disposed within the ear piece housing;
a transceiver disposed within the ear piece housing and operatively connected to the intelligent control;
a microphone operatively connected to the intelligent control;
a speaker operatively connected to the intelligent control;
an inertial sensor operatively connected to the intelligent control to track head orientation and movement;
a sensor operatively connected to the intelligent control;
wherein the intelligent control is configured to receive input from the microphone, the inertial sensor, and the sensor and communicate the input through the transceiver to an electronic device in operative communication with the transceiver;
wherein the intelligent control is configured to receive incoming audio communicated from the electronic device in operative communication with the transceiver and process the incoming audio based on audio preferences;
wherein the intelligent control is configured to process voice sound communications received through the microphone to determine voice commands;
wherein the intelligent control is configured to use the head orientation and movement to provide additional contextual information.

2. The apparatus of claim 1 wherein the electronic device is a phone having a foldable display.

3. The apparatus of claim 1 wherein the electronic device is a computer.

4. The apparatus of claim 1 wherein the electronic device is a phone having a first display and a second display with a hinge between the first display and the second display.

5. The apparatus of claim 1 wherein the electronic device is a vehicle.

6. The apparatus of claim 1 wherein the electronic device is an entertainment device.

7. The apparatus of claim 1 wherein the electronic device is a television.

8. An apparatus comprising:
a housing configured as a headset having a left ear portion and a right ear portion and a central portion spanning between the left ear portion and the right ear portion;
an intelligent control disposed within the housing;
a transceiver disposed within the housing and operatively connected to the intelligent control;
a microphone operatively connected to the intelligent control;
a speaker operatively connected to the intelligent control;

an inertial sensor operatively connected to the intelligent control;
a sensor operatively connected to the intelligent control;
wherein the intelligent control is configured to receive input from the microphone, the inertial sensor, and the sensor, and communicate the input through the transceiver to an electronic device in operative communication with the transceiver;
wherein the intelligent control is configured to receive incoming audio communicated from the electronic device in operative communication with the transceiver and process the incoming audio based on audio preferences;
wherein the intelligent control is configured to process voice sound communications received through the microphone to determine voice commands;
wherein the intelligent control is configured to use the head orientation and movement to provide additional contextual information.

9. The apparatus of claim 8 wherein the electronic device is a phone having a foldable display.

10. The apparatus of claim 8 wherein the electronic device is a computer.

11. The apparatus of claim 8 wherein the electronic device is a phone having a first display and a second display with a hinge between the first display and the second display.

12. The apparatus of claim 8 wherein the electronic device is a vehicle.

13. The apparatus of claim 8 wherein the electronic device is an entertainment device.

14. The apparatus of claim 8 wherein the electronic device is a television.

* * * * *